US007882419B2

(12) United States Patent
Takakuwa

(10) Patent No.: US 7,882,419 B2
(45) Date of Patent: Feb. 1, 2011

(54) COMMUNICATIONS LINE MONITORING SYSTEM, RELAY APPARATUS, AND COMMUNICATIONS LINE MONITORING METHOD

(75) Inventor: Makoto Takakuwa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1182 days.

(21) Appl. No.: 11/462,816

(22) Filed: Aug. 7, 2006

(65) Prior Publication Data

US 2007/0230083 A1 Oct. 4, 2007

(30) Foreign Application Priority Data

Mar. 8, 2006 (JP) .............................. 2006-062262

(51) Int. Cl.
*H03M 13/00* (2006.01)
(52) U.S. Cl. .................... 714/761; 714/718; 714/798
(58) Field of Classification Search .................. 714/718, 714/798, 764, 774, 787, 799, 4
See application file for complete search history.

(56) References Cited

U.S. PATENT DOCUMENTS 4,451,916 A * 5/1984 Casper et al. ................... 714/4

| | | | |
|---|---|---|---|
| 6,557,122 B1 * | 4/2003 | Sugauchi et al. | 714/57 |
| 6,865,593 B1 * | 3/2005 | Reshef et al. | 709/203 |
| 7,188,282 B2 * | 3/2007 | Walmsley | 714/718 |
| 7,346,002 B2 * | 3/2008 | Hashimoto et al. | 370/236 |
| 7,453,900 B2 * | 11/2008 | Robinson et al. | 370/431 |

FOREIGN PATENT DOCUMENTS

JP    3-7439    1/1991

* cited by examiner

*Primary Examiner*—Fritz Alphonse
(74) *Attorney, Agent, or Firm*—Fujitsu Patent Center

(57) ABSTRACT

A communications line monitoring system of the present invention comprises a plurality of relay apparatus and a communications line monitoring apparatus for monitoring a line quality of a communications line of relayed data, and each of the relay apparatus comprises error detecting unit for detecting errors in received data, previous error detection determination unit for determining whether or not error detection has already been performed in other apparatus based on previous error detection information of the received data, and initial error detection process unit for, only when an error is detected and the error was undetected in other apparatus, autonomously notifying error detection information to the communications line monitoring apparatus, and for adding previous error detection information to data for transmission.

16 Claims, 17 Drawing Sheets

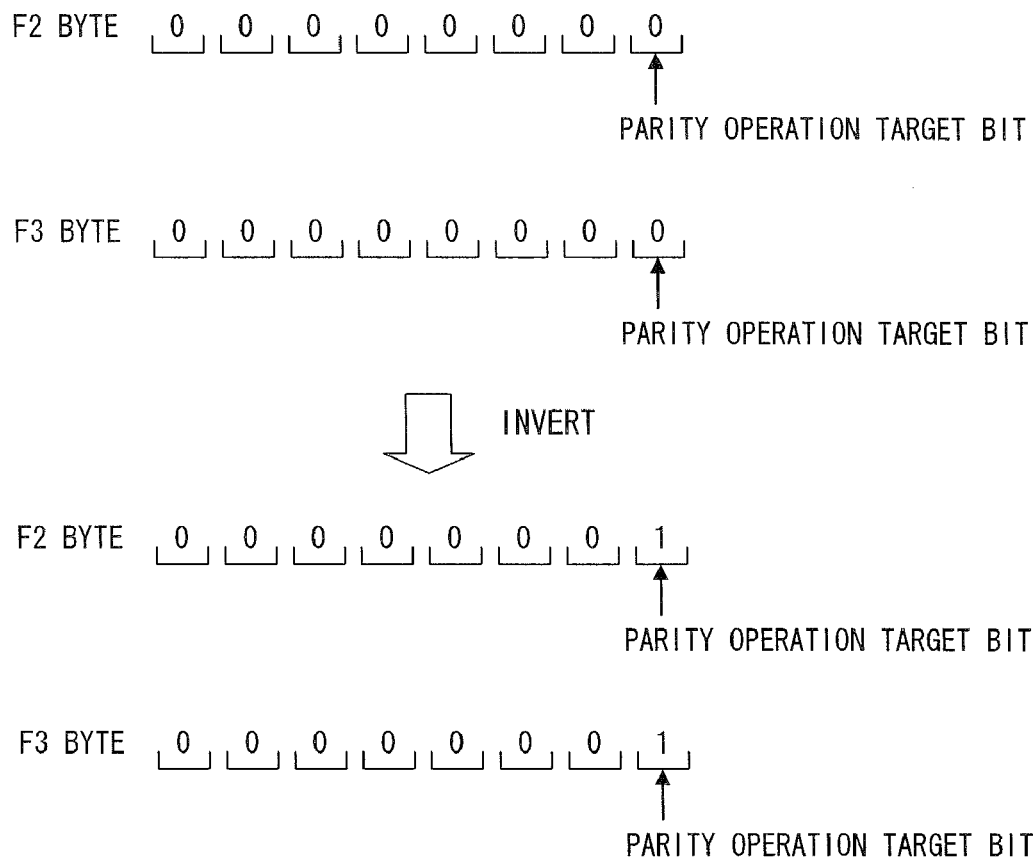
F I G. 5

[PERFORMANCE TABLE OF FACILITY XX]
| ITEM NUMBER | TIME | NUMBER OF NEWLY DETECTED ERRORS | TOTAL NUMBER OF ERRORS |
|---|---|---|---|
| 1 | 8:00 | 0 | 10 |
| 2 | 8:15 | 0 | 0 |
| 3 | 8:30 | 15 | 15 |
| 4 | 8:45 | 0 | 30 |
| 5 | 9:00 | 2 | 5 |
F I G. 8

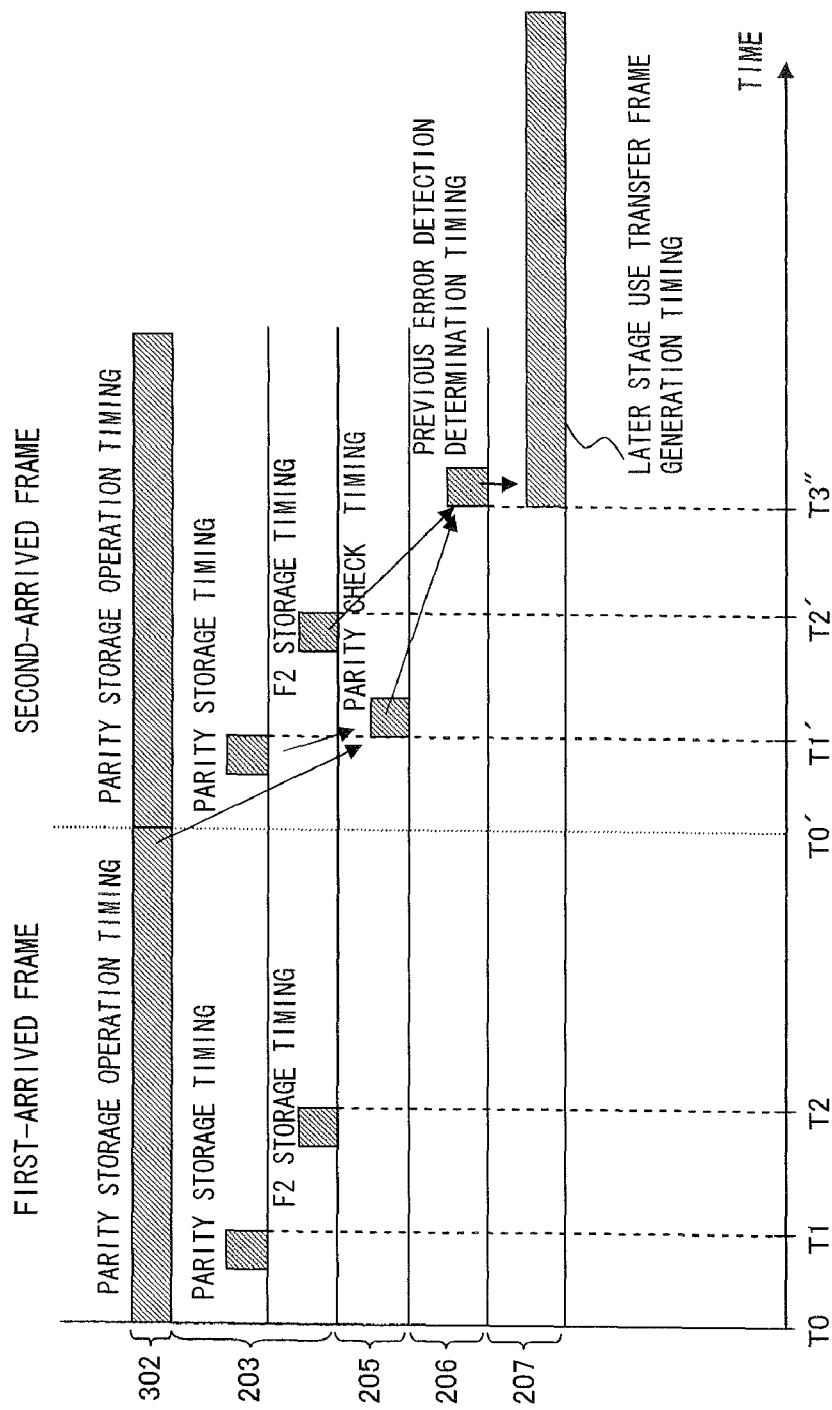
F I G. 1 1

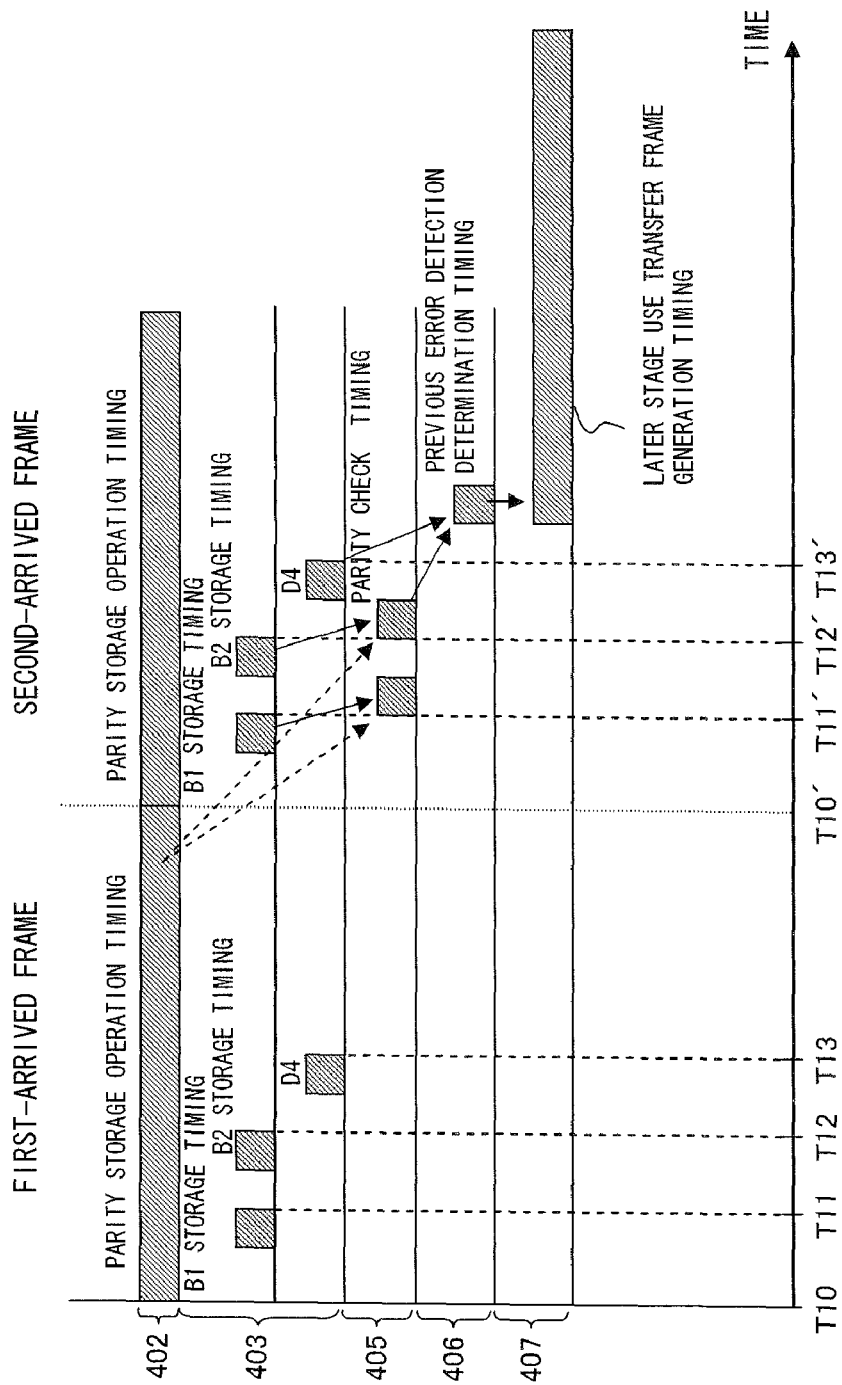
F I G. 1 3

COMMUNICATIONS LINE MONITORING SYSTEM, RELAY APPARATUS, AND COMMUNICATIONS LINE MONITORING METHOD

BACKGROUND OF THE INVENTION

1. Field of the Invention

The present invention relates to a technology for monitoring the line quality of communications lines.

2. Description of the Related Art

Synchronous Digital Hierarchy/Synchronous Optical Network (SDH/SONET) is one of several standards of optical transmission technologies, which enable high-speed line transmissions through combining and multiplexing slower lines hierarchically in order to increase transmission speeds.

In such a SDH/SONET network, remote management of the line quality of the entire network by a communications line monitoring apparatus can be realized by activating the performance monitoring function of a transmission apparatus established in a network.

Transmission data, alternatively referred to as communication frames, transmitted through the SDH/SONET network, has an overhead unit to which an area for storing the parity operation result of a communication frame transmitted prior is assigned.

First, parity operation is performed on communication frames to be transmitted in a transmission side apparatus, and result of the previously performed parity operation is written in a parity operation result storing area in the communication frames to be transmitted. The relay apparatus, which receives these communication frames, performs the same parity operation as above on the communication frame received first, compares a value of the operation result with a value of the parity operation result written in the communication frame received second, and determines the presence or absence of a failure of the line. The relay apparatus repeatedly performs the process on each of the communication frames. While the performance monitor function of the receiver side relay apparatus is activated, the receiver side relay apparatus counts the number of errors determined in units of a prescribed time such as every 15 minutes or every day. The relay apparatus autonomously transmits a notification message to the communications line monitoring apparatus at a prescribed timing such as every 15 minutes or at noon.

Note that a form in which wrong line switching does not occur in the receiver apparatus by continuing the warning output when an abnormal state continues in a section in a relayed transmission path is also disclosed (see Japanese Patent Application Publication No. 03-007439).

In recent years, the processing capacity of relay apparatuses has increased, and the capacity of a signal transmitted in one optical fiber has been dramatically increased as well. Meanwhile, the smallest unit of a path is required to remain the same as the existing lines from the market since there is a problem regarding removing the existing lines. The currently manufactured apparatuses for establishing networks have the smallest unit of path being the same as the existing ones so as to meet the requirements from the market.

Since the smallest unit of a path does not change while transmission quantity is increasing, the number of paths that one relay apparatus comprise is consequently increased. This means the increase in the number of paths per one relay apparatus monitored by a communications line monitoring apparatus results in an adverse effect such as a drastic increase in the number of processes of a communications line monitoring apparatus performing central management of each relay apparatus in the network. At present, the communications line monitoring apparatus performs various processes such as collective setting of communications lines to each relay apparatus, time management of each relay apparatus (a process for synchronizing the time of the communications line monitoring apparatus with the time of the relay apparatuses), backup of database in each relay apparatus, as well as a process for notification messages autonomously transmitted from each of the relay apparatuses and line quality management of each path based on the notification messages. Therefore, the communications line monitoring apparatus performs priority control of processes so that an administrator can perform satisfactory processes.

However, even if the priority control is performed, there may be a case that the processes are not performed sufficiently such as a case of communications line failure such that a large quantity of notification messages is transmitted from relay apparatuses. There is a plurality of types of units in which a relay apparatus checks the quality of communications lines such as units of path or units of section. If one relay apparatus detects communication failure, the following other relay apparatus detects the same communication failure, and therefore, in a case that the above communication failure occurs, the total number of notification messages transmitted from each relay apparatus to the communications line monitoring apparatus increases greatly. Consequently, congestion may be caused in the transmission paths (control lines) of notification messages, or loading of processes in the communications line monitoring apparatus may increase drastically. Because this would cause delay in execution of highly prioritized processes, it is considered as problem. In order to perform highly prioritized processes on a priority basis, generally a performance monitor function in the relay apparatuses is not activated and line quality notification messages are not transmitted from relay apparatuses to the communications line monitoring apparatus. The line quality check of a line is performed only when complaints about the line quality are received from clients using a line by activating the performance monitor function of the applicable relay apparatus.

SUMMARY OF THE INVENTION

It is an object of the present invention to provide a communications line monitoring system for controlling notification messages autonomously transmitted to a communications line monitoring apparatus. The communications line monitoring system is assumed to have a plurality of relay apparatuses and a communications line monitoring apparatus for monitoring line quality of a communication path of data transmitted between the plurality of relay apparatuses. Each relay apparatus comprises an error detection unit for detecting an error in the data received in each relay apparatus (received data); a previous error detection determination unit for determining whether or not the error detection has already been performed on the received data in other relay apparatuses (the other relay apparatus is a relay apparatus other than the relay apparatus currently being explained, and in particular, each relay apparatus upstream of the data transmission) based on whether or not previous error detection information is added to the received data; and an initial error detection process unit, used only when an error is detected in the received data and the error in the received data has been undetected in other relay apparatus, for notifying the communications line monitoring apparatus of error detection information of abnormality in the line, and adding previous error detection information to data transmitted to a downstream relay apparatus (downstream relay apparatus is each relay apparatus on the communication path thereto the data is transmitted).

It is another object of the present invention to provide a relay apparatus for controlling notification messages autonomously transmitted to a communications line monitoring apparatus. The relay apparatus, which is assumed to examine received data and when an error is present in the received data, to notify the communications line monitoring apparatus regarding line failure, comprises an error detection unit for detecting errors in the received data, a previous error detection determination unit for determining whether or not the error detection has already been performed on the received data in another relay apparatus based on whether or not previous error detection information has already been added to the received data, and an initial error detection process unit, used only when an error is detected in the received data and the error in the received data has been undetected in other relay apparatus, for notifying the communications line monitoring apparatus of error detection information of abnormality in the line, and for adding previous error detection information to data transmitted to a downstream relay apparatus.

It another object of the present invention to provide a communications line monitoring method for controlling notification messages autonomously transmitted to a communications line monitoring apparatus. The method, assumed to be performed in a communications line monitoring system comprising a plurality of relay apparatuses and a communications line monitoring apparatus (for monitoring line quality of a communication path of data transmitted between the plurality of relay apparatuses), checks for presence or absence of an error in data received by the relay apparatus, notifies the communications line monitoring apparatus of error detection information of abnormality in the communications line when an error is detected in the received data, and controls notification of the error detection information from the downstream relay apparatus to the communications line monitoring apparatus when the error is redetected in a relay apparatus locating downstream of the relay apparatus.

BRIEF DESCRIPTION OF THE DRAWINGS

FIG. 5 is an example of inverting an even number of bits in the parity operation target bit;

FIG. 8 is the count result information managed by a performance table;

FIG. 11 is a timing chart diagram of the signal process of the node of the variation example;

FIG. 13 is a timing chart of the signal process of the transmission apparatus of embodiment 2;

DESCRIPTION OF THE PREFERRED EMBODIMENT

Figure 1:
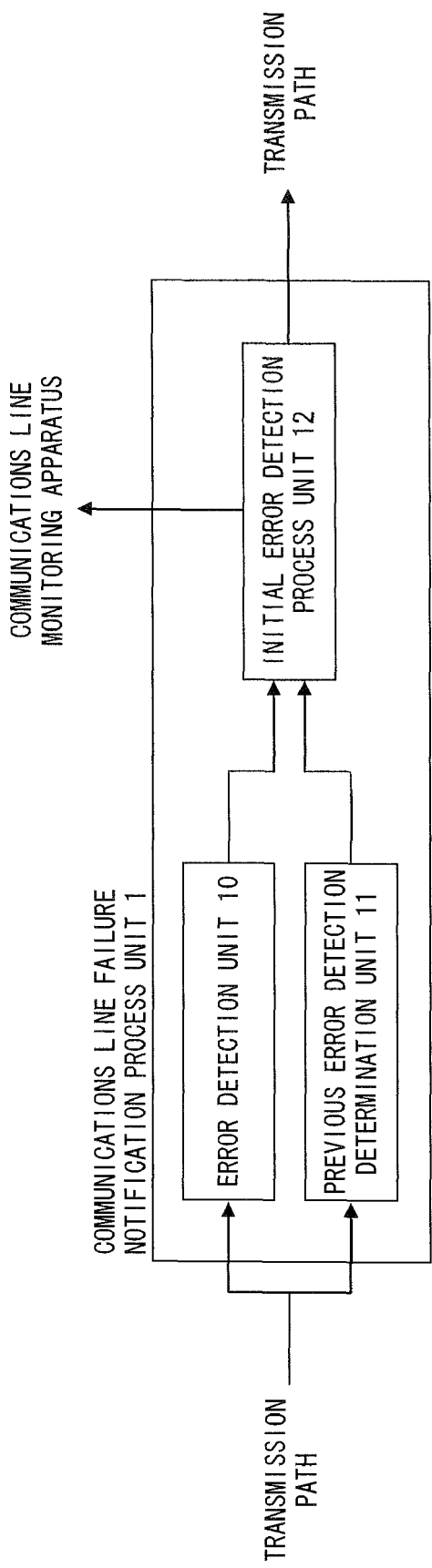
FIG. 1 is a diagram showing a fundamental configuration of a communications line failure notification unit in a relay apparatus.

One mode of the communications line monitoring system of the present invention is assumed to have a plurality of relay apparatuses and a communications line monitoring apparatus for monitoring line quality of a communication path of data transmitted between the plurality of relay apparatuses. Each of the relay apparatuses comprises an error detection unit for detecting an error in the data received in each relay apparatus (received data), a previous error detection determination unit for determining whether or not the error detection has already been performed on the received data in other relay apparatus (other relay apparatus is an relay apparatus other than the relay apparatus currently being explained, and in particular, each relay apparatus that is arranged upstream of the data transmission) based on whether or not previous error detection information is added to the received data, and an initial error detection process unit (used only when an error is detected in the received data and the error in the received data has been undetected in other relay apparatus) for notifying the communications line monitoring apparatus of error detection information of abnormality in the line, and for adding previous error detection information to data transmitted to a downstream relay apparatus (downstream relay apparatus is each relay apparatus on the communication path to transmit the data).

In such a case, for example, the error detection unit detects an error in the received data by comparing parity operation result information included in advance in the received data with the operation result information of parity operation performed on the received data. The initial error detection process unit, when adding previous error detection information to data transmitted to a downstream relay apparatus, adds the previous error detection information in an arrangement so as not to influence the error detection result.

Note that, in order to ensure data consistency with a network (an external network) other than the internal network comprising the relay apparatuses, the communications line monitoring system further comprises an internal initialization unit for changing a value (the value is setting information of the external network) at a target position (a position in data that the previous error detection information is added to or extracted from within the internal network) for adding the previous error detection information in data transmitted from an external network to undetected information and an external initialization unit for changing a value at a target position for adding the previous error detection information in data transmitted from an external network to external network setting information.

Another mode of the communications line monitoring system of the present invention is assumed to have a plurality of relay apparatuses to which a main signal line transmitting main data and a sub-signal line transmitting sub-data (e.g. control information) are set and a communications line monitoring apparatus for monitoring line quality of the communication path of data transmitted between the plurality of relay apparatuses. Each of the relay apparatuses comprises an error detection unit for detecting an error in the main data received from the main signal line, a previous error detection determination unit for determining whether or not error detection has already been performed on the main data in another relay apparatus based on whether or not previous error detection information is added to the sub-data received from the sub-signal line, and an initial error detection process unit (used only when an error is detected in the main data and the error in the main data has been undetected in another relay apparatus), for notifying the communications line monitoring apparatus of error detection information of abnormality in the main signal line and for adding previous error detection information to sub-data transmitted to a downstream relay apparatus.

A third mode of the relay apparatus of the present invention is assumed to examine received data and, when an error is found to be present in the received data, to notify line failure to the communications line monitoring apparatus. This mode comprises an error detection unit for detecting an error of the received data, a previous error detection determination unit for determining whether or not the error detection has already been performed on the received data in another relay apparatus based on whether or not previous error detection information is added to the received data, and an initial error detection process unit (used only when an error is detected in the received data and the error in the received data has been undetected in other relay apparatus) for notifying the communications line monitoring apparatus of error detection information of abnormality in the line and for adding previous error detection information to data transmitted to a downstream relay apparatus.

Note that when the error detection unit is configured so as to detect an error in the received data by comparing parity operation result information included in advance in the received data with operation result information of parity operation directly performed on the received data received by the relay apparatus, the initial error detection process unit (when adding previous error detection information to data being transmitted to a downstream relay apparatus) should be configured to add the previous error detection information in an arrangement so as not to influence the error detection result (that is, an arrangement whereby determination of previously detected or undetected error is not influenced by the added precious error detection information alone).

For example, when the parity operation is performed on the received data for every prescribed bit, the initial error detection process unit is configured to add the previous error detection information by inverting a prescribed even number of bits of parity operation target bit.

The error detection unit may be configured so as to perform the parity operation of the received data by replacing a value at a target position for adding the previous error detection information and to detect an error in the received data by comparing operation result information of the parity operation with parity operation result information included in advance in the received data.

In order to ensure data consistency with an external network, the relay apparatus further comprises an internal initialization unit for changing a value at a target position for adding the previous error detection information in data transmitted from an external network to undetected information and an external initialization unit for changing a value at a target position for adding the previous error detection information in data transmitted from an external network to external network setting information.

A fourth mode of the relay apparatus of the present invention is assumed to have a main signal line transmitting main data and a sub-signal line transmitting sub-data, for examining the main data and, if an error is present in the main data, for notifying main line failure to the communications line monitoring apparatus. This comprises an error detection unit for detecting an error in the main data received from the main signal line, a previous error detection determination unit for determining whether or not error detection has already been performed on the main data in another relay apparatus (based on whether or not previous error detection information is added to the sub-data received from the sub-signal line), and an initial error detection process unit (used only when an error is detected in the main data and the error in the main data has been undetected in another relay apparatus) for autonomously notifying the communications line monitoring apparatus of error detection information of abnormality in the main signal line, and for adding previous error detection information to sub-data transmitted to a downstream relay apparatus.

Another mode of the communications line monitoring method of the present invention is assumed to be performed in the communications line monitoring system having a plurality of relay apparatuses, a communications line monitoring apparatus for monitoring line quality of the communication path of data transmitted between the plurality of relay apparatuses. The presence or absence of an error in data received by the relay apparatus is examined, the communications line monitoring apparatus is notified of error detection information of abnormality in the communications line (when an error is detected in the received data), and when the error is redetected in a relay apparatus located downstream of the earlier relay apparatus, notification of the error detection information from the downstream relay apparatus to the communications line monitoring apparatus is controlled.

By having the above configuration, when any failure occurs in a communications line in a data transmission network and any error is generated in the data signal transmitted in the communication line, notification (notification message) of the communications line failure to the communications line monitoring apparatus is performed autonomously only by the relay apparatus, which first detected the error from the data signal. Consequently, the number of notification messages transmitted in lines (control lines in general) between each relay apparatus and the communications line monitoring apparatus can be reduced.

In the following description, the preferred embodiment of the present invention is set forth with reference to the drawings.

FIG. 1 is a diagram showing a fundamental configuration of a communications line failure notification process unit in a relay apparatus of the data transmission network where central control of the line quality is performed in the communications line monitoring apparatus.

In the data transmission network, a data signal having "information used for detecting communications line failure" arranged on a prescribed area is transmitted. The above "information used for detecting communications line failure" has two types that are, for example, "information used for error detection of the data signal (actual error detection information)" and "information indicating the error has been detected in a data signal (previous error detection information)", both are explained later.

Based on the above data signal, the relay apparatus of the present data transmission network performs a notification process of line failure in the communication path of the data signal in a communication line failure notification process unit. Note that in the present description, the word "relay apparatus" is used in a broad sense, and indicates various apparatuses having a form to input/output a data signal transmitted in a data transmission network (such as nodes or transmission apparatuses with a data multiplexing/demultiplexing function or a cross-connect function).

As shown in FIG. 1, a communication line failure notification process unit 1 comprises an error detection unit 10, a detected error determination unit 11, and an initial error detection process unit 12.

The error detection unit 10 detects an error in a received data signal. When a data signal in the above format example is received (the data signal with "actual error detection information" and "previous error detection information" arranged in a prescribed area), by using the actual error detection information contained in the received data signal as a comparison standard, whether or not the received data signal actually generates an error or not is detected.

The detected error determination unit 11 determines whether or not the received data signal has already gone through error detection in other relay apparatus. When the data signal in the above format example is received, the determination is made based on whether or not the previous error detection information is contained in the received data signal.

The initial error detection process unit 12 autonomously notifies the communication line monitoring apparatus (hereinafter also referred to as "upper apparatus") of error detection information as one of information indicating the line quality of the received data, only when an error is detected in the received data and the previous error detection information is not contained in the received data signal. In addition, the previous error detection information is provided when the received data signal is sent out to the data transmission path. Note that the notification method to the communications line monitoring apparatus has two types: a notification upon receiving a notification request from the communications line monitoring apparatus and a notification without receiving a notification request. The above described autonomous notification refers to the latter.

Here, the error detection information is notified to the communications line monitoring apparatus when an error is detected in the received data signal; however, the autonomous notification is limited to a case that the relay apparatus is the first to detect the error. When an error is detected in the received data signal, the previous error detection information is provided to the received data signal. In the case of the data signal in the above format example, this can be implemented by including the "previous error detection information" in the position of the "information used for communication line error detection" in the received data signal.

As described above, according to the present configuration, when any failure occurs in a communications line in a data transmission network and any error is generated in the data signal transmitted in the communication line, notification of the communications line failure to the communications line monitoring apparatus is performed autonomously only by the relay apparatus which detected the error first from the data signal. Consequently, the number of notification messages transmitted in a line between each relay apparatus and the communications line monitoring apparatus (referred to as a control line, in general) can be reduced to a small number, and congestion in the line can be controlled.

In the following description, details of the notification process of the communication line failure are explained with examples of an optical transmission network (SDH network) where the line quality central management is performed in the communication line monitoring apparatus.

Figure 2:
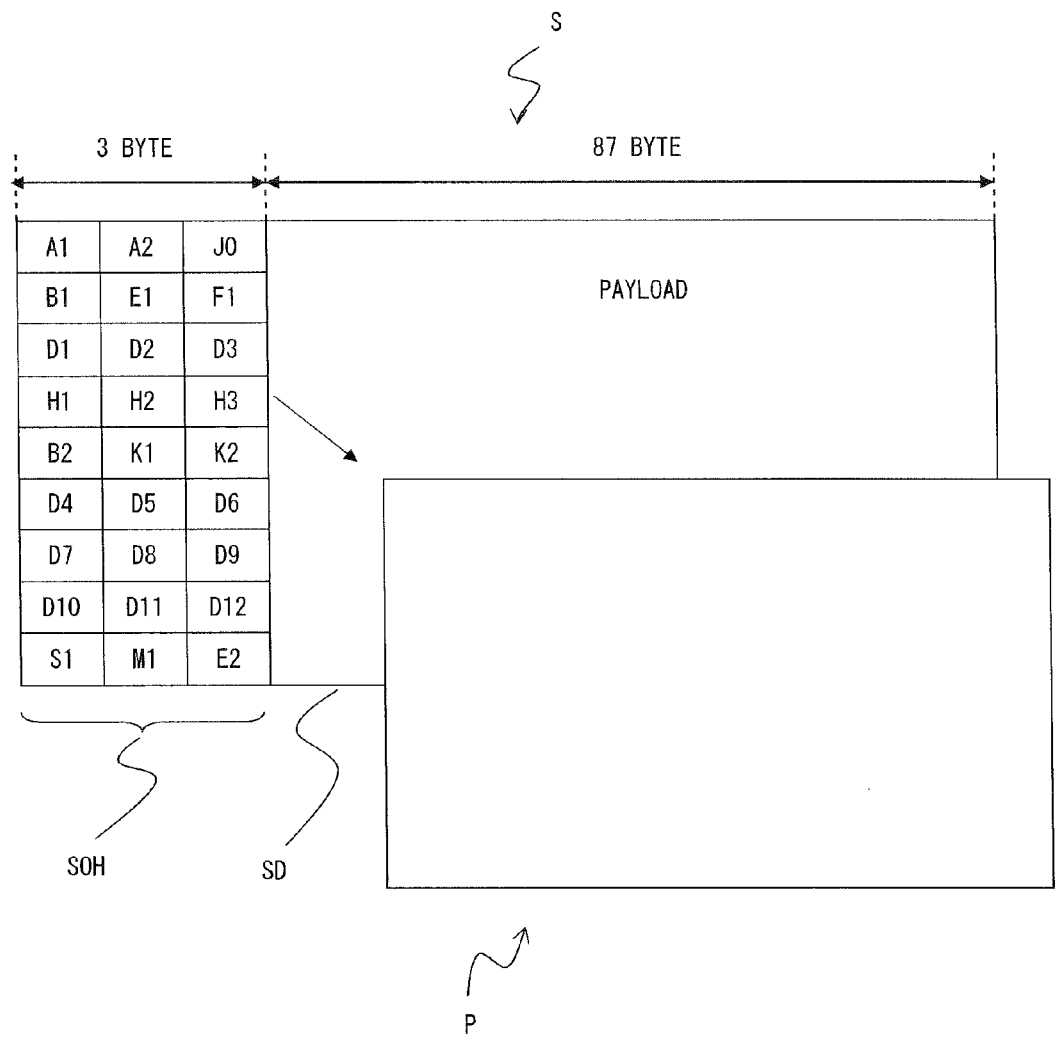
FIG. 2 is a data format example of a communication frame handled in the SDH network.

FIG. 2 is a data format example of a communication frame handled in the SDH network.

In the present embodiment, a section frame and VC3 (Virtual Container 3) of STM-0 interface are employed. Note that the format of each of the frames and handling of each of the frames in the communication apparatus comply with TTC standard JT-G707.

The section frame S comprises a section overhead unit SOH and a payload unit SD. The section overhead unit SOH is provided with 27 types from A1 to E2 of areas, and each area has 8 bits (A1 . . . E2 are hereinafter referred to as A1 byte . . . E2 byte). This area contains section management information. As an example, frame synchronize information is set to A1 and A2 bytes, a frame identification number is set to C1 byte, error detection information of a section (referred to as section actual error detection information in this description) is set in the B1 and B2 bytes, and a pointer indicating a position of a path frame P explained later is set to H1-H3 bytes. The payload unit SD is a data area and the path frame P, in which the position is indicated by the above pointer is mapped.

The section frame S is a frame having a plurality of path frame P mapped on the payload unit SD. In the following, the section frame S is referred to as a high-order frame and the path frame P is referred to as a low-order frame, as appropriate.

Figure 3:
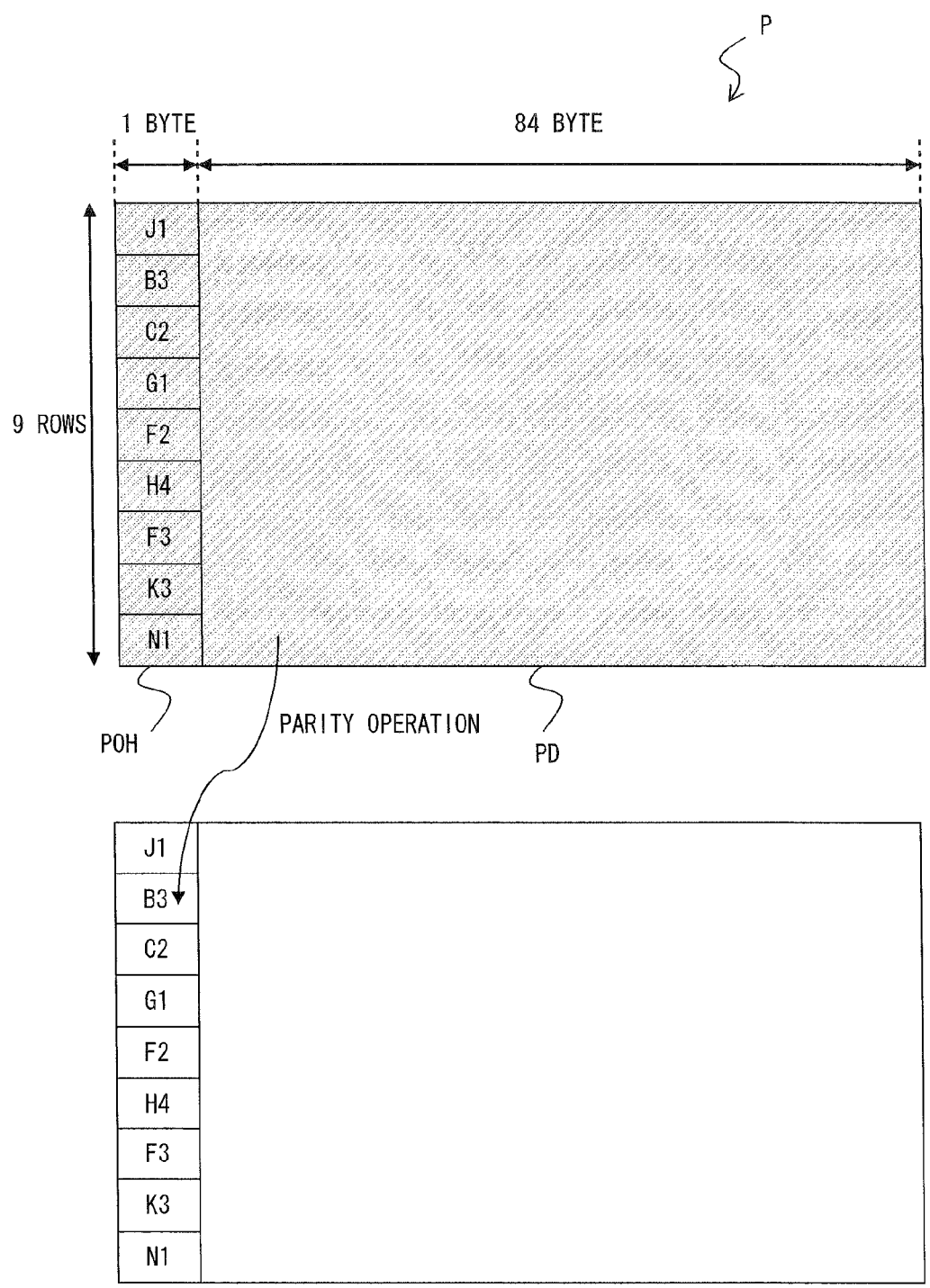
FIG. 3 is an example of a specific configuration of a frame of the VC3 path frame.

FIG. 3 is an example of a specific configuration of a frame of the VC3 path frame.

The above path frame P, as shown in FIG. 3, comprises a path overhead unit POH and a payload unit PD.

The path overhead unit POH is provided with 9 types from J1 to N1 of areas, and each area has 8 bits (J1 . . . N1 are hereinafter referred to as J1 byte . . . N1 byte). In this area, path management information is contained. Among the areas, path frame error detection information (referred to as path actual error detection information in this description) is set in B3 byte. Values can be set freely in F2, F3 and other bytes, for those areas are set as undefined areas for user.

Figure 4:
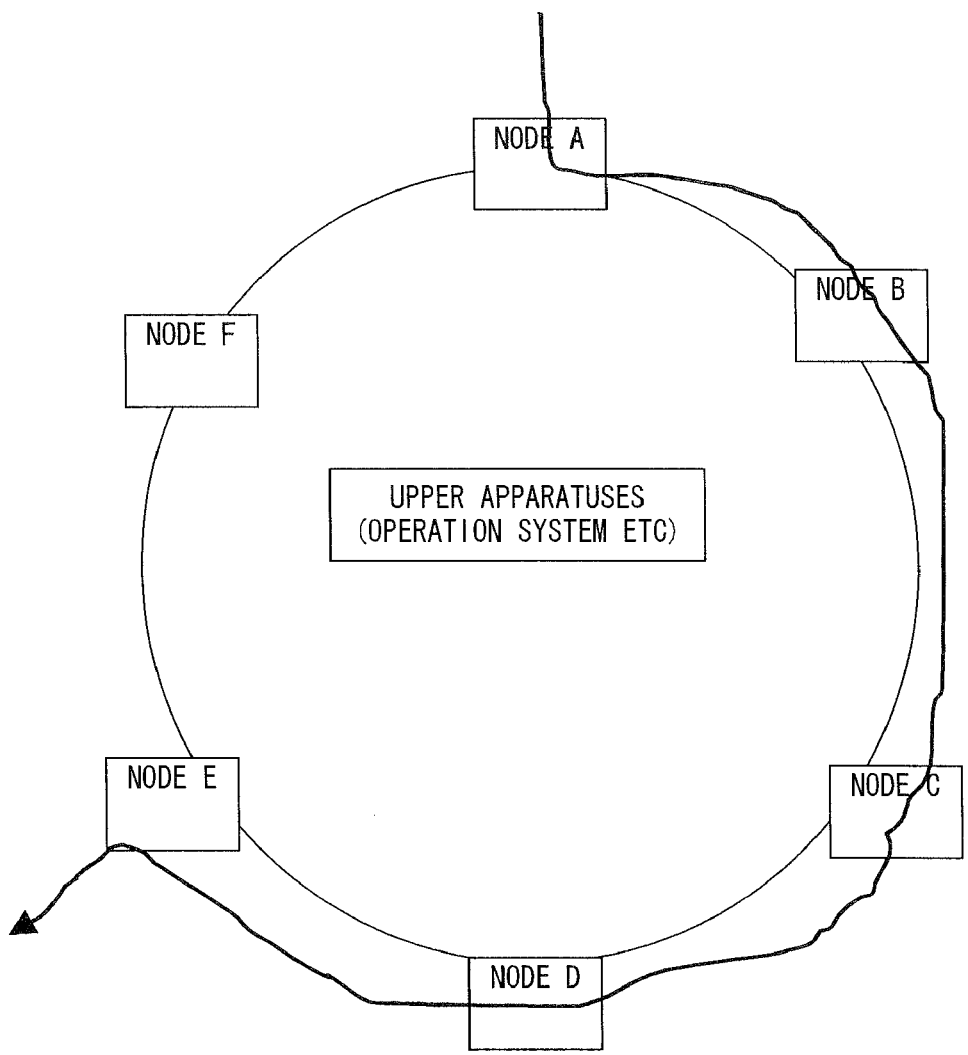
FIG. 4 is a configuration diagram of a ring topology optical transmission network.

FIG. 4 is a configuration diagram of a ring topology optical transmission network. In the ring topology optical transmission network of FIG. 4, node A through node F are connected in the alphabetical order by an optical transmission path. Between these nodes has one or a plurality of transmission apparatuses, not shown in FIG. 4. The optical transmission network is a high-speed network, and transmits high-order communication frames having mapped communication frames of an external network, not shown in FIG. 4, connected to respective prescribed nodes.

A dotted arrow of FIG. 4 represents a transmission path of a communication frame. A communication frame passes the path in a manner described below. Low-order communication frames flowing in an external network (slow-speed network) are loaded by node A, and a high-order communication frame mapping a plurality of frames of the low-order communication frames is transmitted in the ring topology optical transmission network. Then, the low-order communication frame split from the high-order communication frame is branched to the low-speed network side in node E.

In the following description, a specific configuration of an apparatus arranged in the optical transmission network is provided.

It should be noted that in the following explanation, the section termination is performed in the above nodes; however the section termination is not performed in the transmission apparatus between nodes. In addition, assume that the number of path frames mapped in the section frame is one, for the purpose of simplifying the explanation.

Embodiment 1

Embodiment one represents a configuration for implementing line quality information monitoring in a node performing section termination in the upper apparatuses. First, an error detection method employing B3 byte actual error detection information and a user area (F2 bytes. F3 bytes etc.) provided in the path overhead unit POH is explained.

In a case with a path frame, BIP (Bit Interleaved Parity)-8 is defined in B3 byte. The BIP-8 indicates that parity operation to a path frame is performed for each first bit through eighth bit for the execution.

Then, in an apparatus generating a path frame, BIP-8 operation is applied within a range of all bits of the path frame P shown by slanting lines, and the operation result (i.e. BIP-8 code) is stored in B3 area of a frame of the next transmission order. An apparatus receiving these frames (nodes in this embodiment) checks an error in the previously received path frame by comparison between the re-operation result by BIP-8 of the received path frame (received frame) and the BIP-8 code stored in the path frame received next.

The explanation above is a node checking by itself whether or not an error is generated in a received frame. If the received frame contains an error the node checks only the fact that the error is contained, and the node cannot determine whether or not the error has already been detected in another node. Given this fact, the present embodiment uses F2 byte and F3 byte user areas so as to determine whether or not the error has been detected in another node.

Specifically, in the case that a path frame error is first detected by a node, the parity operation target bit in F2 byte of the path frame is inverted in the node. Similar to F2 byte, the parity operation target bit in F3 byte is inverted.

FIG. 5 is an example of this case. In FIG. 5, the head bit of F2 byte and that of F3 byte are inverted from "0" to "1" (the same result can be obtained by inverting from "1" to "0"). As explained above, F2 and F3 bytes are 8-bit configuration, and BIP-8 is defined in B3 byte. Therefore, the node receives a series of bit sequence in the order of J1 byte, B3 byte, C2 byte, G1 byte, F2 byte, H4 byte, F3 byte, and so on, and the head bit of each byte (this bit corresponds to the 8th bit from the head bit within the parity operation range in one frame) is to be the target of parity operation. Thus, if parity operation target bit in F2 byte alone, as information recording previous detection of error, is changed, for example, the value of F2 byte intentionally changed in the middle will change the parity operation result of the downstream nodes. Then, as in FIG. 5, the same change is made in F3 byte to cancel the inversion of the parity operation result caused by the intentionally changed value. Note that the number of areas to write information indicating previous detection of error is not limited to two as described above, but the number may be an even number such as four or six, in accordance with the data format.

In addition, the information indicating previous detection of error may be used for any area, which is left to users to use, in the overhead, and the information should indicate whether or not the error has already been detected in order to avoid the influence on the parity operation result.

In the present embodiment, as explained above, an even number of user areas (two areas in the present embodiment) are used as storage area of "information for determining previous error detection" such as "previous error detection information" and "error undetected information". By using an even number of areas, even if values are changed in the middle, the inversion of the parity operation result values after the change are canceled, and the downstream nodes can obtained parity operation result without being influenced by the value of these areas. In each node, even if the received frame has an error, it is possible to determine whether or not the error has already been detected by another node, by checking the values of the user area.

Figure 6:
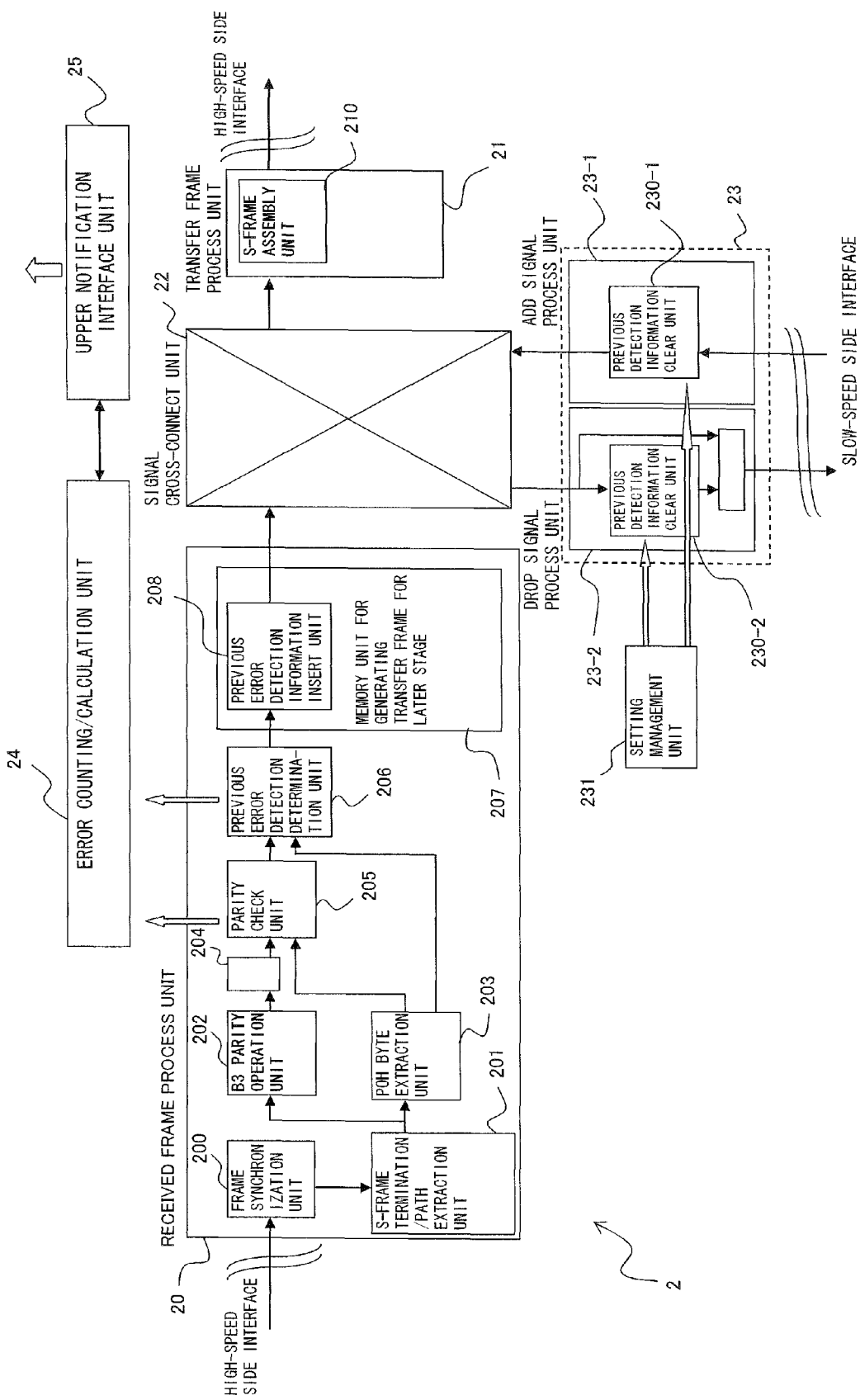
FIG. 6 is a functional block diagram of the node of embodiment 1.

FIG. 6 is a functional block diagram of the node.

As shown in FIG. 6, the node 2 of the example comprises a received frame process unit 20, a transmission frame process unit 21, a signal cross-connect unit 22, an add/drop signal process unit 23, an error counting/calculation unit 24, and an upper notification interface unit 25.

The received frame unit 20 comprises a frame synchronization unit 200, an S-frame (section frame) termination/path extraction unit 201, a B3 parity operation unit 202, a POH (path overhead) byte extraction unit 203, a operation result delay unit 204, a parity check unit 205, a previous error detection determination unit 206, and a memory unit 207 for generating transfer frame for later stage. The memory unit 207 for generating transfer frame for later stage comprises a previous error detection information insert unit 208.

It should be noted that a high-speed interface unit, although not shown in FIG. 6, is provided in a former stage of the frame synchronization unit 200. The high-speed interface unit changes the optical signal passing through the transmission path to a signal mode handled in the received frame process unit 20 (electrical signal or optical signal) by performing for example a wavelength division process or 3R process (a waveform shaping process, an amplification process, and a data identification process) and as necessary, a photoelectric conversion process. In the following description, a case with the handling mode being an electrical signal is explained.

The frame synchronization unit 200 performs frame synchronization based on a signal obtained from the interface unit in the high-speed side, and specifies the head position of the received frame. The following S-frame termination/path extraction unit 201 performs section termination of the received frame obtained in the frame synchronization unit 200, detects alarm etc. of the section, and divides a plurality of path frames (one path frame in this example) mapped on the received frame into each individual path frame. The path frame output from the S-frame termination/path extraction unit 201 is output to the B3 parity operation unit 202 and the POH byte extraction unit 203, and furthermore, although a signal line (solid-lined arrow) is not shown in FIG. 6 in particular, it is output to the memory unit 207 for generating transfer frame for later stage.

The POH byte extraction unit 203 sequentially extracts B3 byte information in POH of the path frame output from the S-frame termination/path extraction unit 201, and information of F2 byte or that of F3 byte (F2 information or F3 information). The B3 parity operation unit 202 inputs the path frame output from the S-frame termination/path extraction unit 201, and obtains the parity operation result by BIP-8 from the path frame.

The information extracted in the POH byte extraction unit 203 is sequentially set to the parity check unit 205 and the previous error detection determination unit 206 as the latest comparison information, and the operation result obtained in the B3 parity operation unit 202 is input to the parity check unit 205 via the operation result delay unit 204.

The operation result delay unit 204 delays the timing to send the operation result received from the B3 parity operation unit 202 to parity check unit 205 until the timing when the B3 information of the next frame is set to the parity check unit 205. In other words, the parity check unit 205 and the previous error detection determination unit 206 in the next stage perform the processes for first-arrived frame of the two successive frames by using the information in POH contained in the second-arrived frame. Note that the timing is explained later with reference to drawings.

The parity check unit 205 compares the above parity operation result with the latest B3 information (i.e. BIP-8 code) set from the POH byte extraction unit 203, and outputs the comparison result (information indicating match or mismatch) to the later stage. In the present example, when the comparison result is mismatched, as shown in an outlined arrow, the mismatch result is output to the error counting/calculation unit 24.

Using the previously mentioned error detection determination unit 206, when the comparison result information is input, preset information indicating the previous detection (or error undetected) and the latest F2 information (or F3 information) set from the POH byte extraction byte 203 are compared with each other, and the determination process is performed based on the comparison result and the comparison result in the parity check unit 205. In this process, each of the items of whether or not the F2 information (or F3 information) is previously detected or undetected and whether or not the comparison result in the parity check unit 205 matches or mismatches is combined with each other and the determination is made in accordance with the combination. The present example has a configuration such that a notification message is notified to the upper apparatuses only in a case that the F2 information (or F3 information) is undetected and the comparison result in the parity check unit 205 is mismatch. The following three types are possible combinations, either one of the following two determinations is made in accordance with each combination.

First, when F2 information (or F3 information) has been undetected, and the comparison result in the parity check unit 205 is mismatched, it is determined that the notification to the error counting/calculation unit 24 is necessary, and insertion of the previous detection information to the path frame is also necessary (determination pattern 1).

Second, when F2 information (or F3 information) has been undetected, and the comparison result in the parity check unit 205 is matched, it is determined that the notification to the error counting/calculation unit 24 is unnecessary, and insertion of the previous detection information to the path frame is also unnecessary (determination pattern 2).

Third, when F2 information (or F3 information) has been detected, and the comparison result in the parity check unit 205 is mismatched, it is determined that the notification to the error counting/calculation unit 24 is unnecessary, and insertion of the previous detection information to the path frame is also unnecessary (determination pattern 2).

The previous error detection determination unit 206 performs the above determination. If the determination is the determination pattern 1, a signal is outputted to the previous error detection information insert unit 208, and a signal is outputted to the error counting/calculation unit 24 as shown in FIG. 6 with an outlined arrow. If the determination is the determination pattern 2, a signal is output to the memory unit 207 for generating transfer frame for later stage.

The memory unit 207 for generating transfer frame for later stage uses the signal output from the previous error detection determination unit as a trigger, and outputs each path frame already inputted from the S-frame termination/path extraction unit 201 to the signal cross-connect unit 22 in the later stage.

The previous error detection information insert unit 208 uses the signal output from the previous error detection determination unit as a trigger, and overwrites F2 byte and F3 byte of POH of each path frame already inputted from the S-frame termination/path extraction unit 201 with a prescribed information (information determined to be the previous error detection in the previous error detection determination unit 206) and output the information to the signal cross-connect unit 22 in the later stage.

Figure 7:
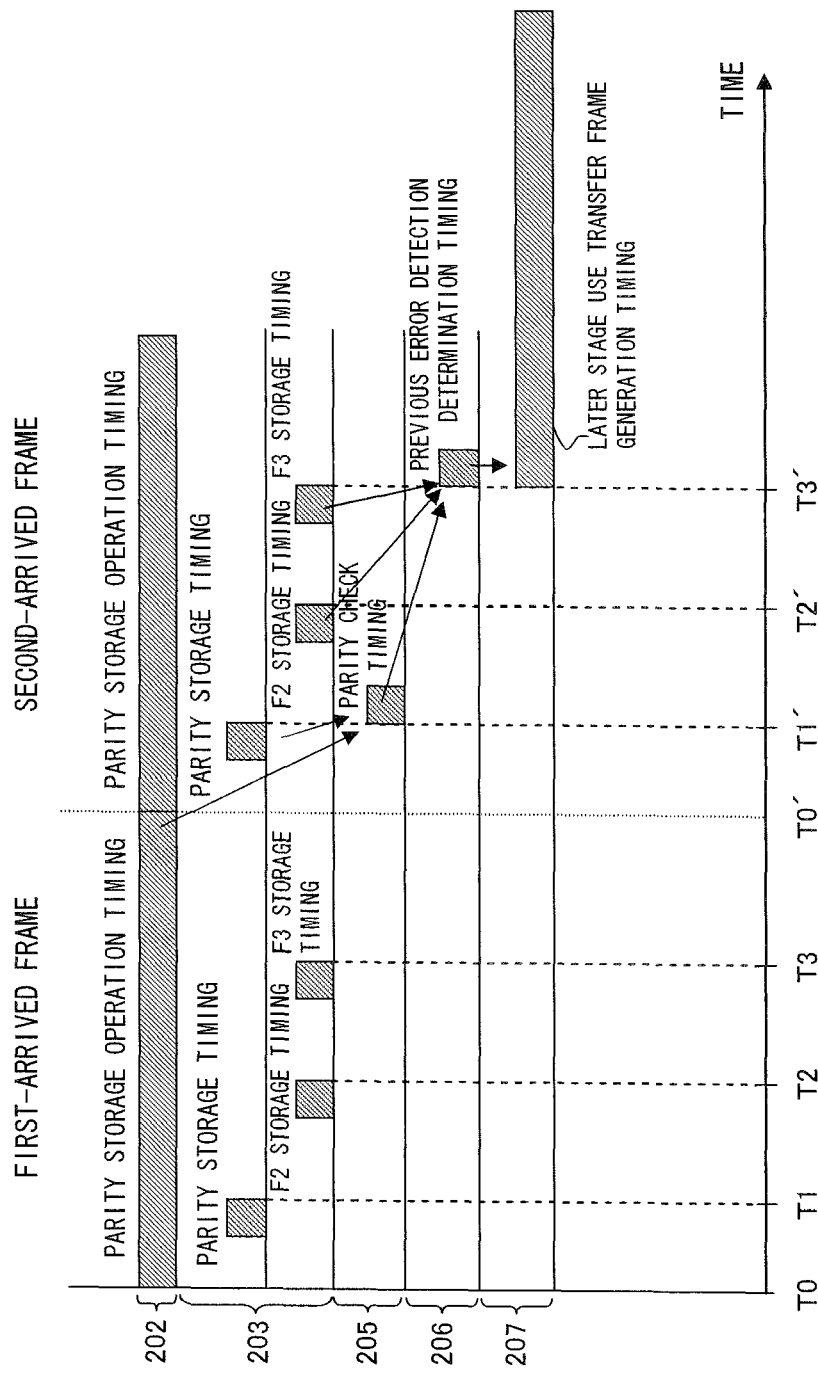
FIG. 7 is a timing chart of the signal process of the node of embodiment 1.

FIG. 7 is a timing chart of the signal process.

In FIG. 7, time is on the horizontal axis (the time goes back as the coordinate moves to the left), and timings of processes in each unit (shaded areas in FIG. 7) are shown in each row on the vertical axis. The numbers on the vertical axis of FIG. 7 are the numerical reference of the corresponding process units in FIG. 6.

FIG. 7 shows process timings of the process targeting the received two successive frames (first-arrived frame and second-arrived frame).

In the following, the explanation of FIG. 7 is provided starting from the top.

In the B3 parity operation unit 202, the parity operation process is executed consecutively from the head bits (T0 and T0') of the frames in the order from the first-arrived frame to the second-arrived frame. Each of B3 byte, F2 byte and F3 byte assigned to POH of each frame are arranged in the same position relative to each head bit, and therefore, in the POH byte extraction unit 203, the bytes are extracted at the same times (T1, T2, T3 or T1', T2', T3') elapsed from the head bit (T0 and T0') for each frame.

The matching check of the parity operation result performed in the parity check unit 205 is a process which can be performed only after calculating the result of the parity operation from the frame, and for that reason the check is performed after the parity operation of the first-arrived frame ends (during parity operation for the second-arrived frame), as shown in FIG. 7. This example has a configuration in which various determination information of the first-arrived frame is stored in the second-arrived frame. Thus, the matching check of the parity operation result is performed after the timing (T1') extracting information in B3 area from the second-arrived frame, as shown in FIG. 7. The matching check is performed by using the parity operation result of the first-arrived frame and the B3 information of the second-arrived frame as indicated by arrows in FIG. 7.

The determination process performed in the previous error detection determination unit 206, because it requires F2 information or F3 information, is performed after extracting F2 byte information from the second-arrived frame. In FIG. 7, the timing of the process is the timing (T3') after extraction of F3 byte, and the determination process is performed by using the information of F2 byte and F3 byte.

The frame generation process in the memory unit 207 for generating transfer frame for later stage is performed after the determination result is obtained. However, the areas influenced by the determination result are F2 area and F3 area to which the previous error detection information is inserted. Thus, frame generation starts without waiting for the end of the determination process as shown in FIG. 7, and the F2 area generation can be performed at the timing that the determination process ends or later.

The explanation moves back to FIG. 6, and other units are explained.

The transmission frame process unit 21 generates a section frame by mapping the path frame output from the signal cross-connect unit 22 on the payload unit SD. A section frame S, which is added with payload unit SD to the section overhead unit SOH in the S-frame assembly unit 210 in FIG. 6, is sent to the transmission path from the high-speed interface via the electro-optical converter unit and the optical multiplexing unit not shown in FIG. 6, and is transmitted to the next relay apparatus.

The signal cross-connect unit 22 cross-connects the path frame. In this example, the signal cross-connect unit 22 pass through a prescribed path frame output from the received frame process unit 20, or changes the path of a part of the path frames to the add/drop signal process unit 23. The path frame (Add path) output from the add/drop signal process unit 23 is combined to the above through path.

The add/drop signal process unit 23 receives/delivers a prescribed path frame between the slow-speed network and the high-speed network. The add/drop signal process unit 23 comprises an add signal process unit 23-1 for sending low-order frames from the slow-speed network side to the high-speed network side and a drop signal process 23-2 for splitting path frames branching the low-order frames to the low-speed network side from the high-speed network side. Each of the add signal process unit 23-1 and the drop signal process unit 23-2 comprises a previous detection information clear unit (230-1 and 230-2), clearing the F2 byte and the F3 byte of the POH of the path frame. In a case of the previous detection information clear unit 230-1, path frames are input to the network comprising an apparatus for detecting the previous detection information, and therefore the clearing in this case is defined as initialization of the values of the F2 byte and the F3 byte to values with which it is not determined as previously detected by the detection apparatus. In the case of the previous detection clear unit 230-2, the path frames containing the previous detection information is branched from a network side comprising an apparatus for detection of the previous detection information to an external network independent of the determination of the detection, and therefore, the clearing in this case is defined as setting the values set in the F2 byte and the F3 byte of the path frame to values which has no significance in the external network (such as "00000000") or values which are fixedly assigned from the external network. In this example, a setting management unit 231 is provided for managing values set in the previous detection information clear units (230-1 and 230-2). Although it would not be necessary if the values do not have to be changed, by comprising the setting management unit 231, it is possible to change the setting value of the previous detection information clear units (230-1 and 230-2) as necessary.

Note that the add/drop signal process unit 23 comprises a slow-speed side interface, the representation of which is omitted in FIG. 6, in the slow-speed network side, and path frames are transmitted/received via the slow-speed side interface unit. In the add signal process unit 23-1, the path overhead added when the path frames are assembled in another apparatus connected to the slow-speed network side may be used as path frames transmitted to the signal cross-connect unit 22, or the path overhead unit may be replaced by performing the parity operation at that time.

The error counting/calculation unit 24 receives the output signal of the parity check unit 205 and the previous error detection unit 206 and counts errors. For example, the error count is increased by 1 for every signal received from the parity check unit 205, and the previous error detection count is increased by 1 for every signal received from the previous error detection determination unit 206. Each count is added up at prescribed intervals.

FIG. 8 is the above count result information managed by a performance table of the error counting/calculation unit 24.

The example in FIG. 8 shows, in a tabular format, the total error number detected in the parity check unit 205 (a total number of the errors detected in the apparatus) and a newly detected number which is the total error number subtracted by the number detected in the previous error detection determination unit 206 (a total number of errors detected in the apparatus for the first time) for every 15 minutes.

In the right side column (Table 1) in FIG. 8, the total number of errors counted regardless of the types such as newly detected or re-detected is recorded, and in the left side column (Table 2) in FIG. 8 the total number of errors newly detected, is recorded. In such a tabular format, for example, a separate usage such as Table 2 is for autonomous notification for upper apparatuses, and Table 1 is for provision in response to the request for error information from the upper apparatuses is possible.

In such a case, the error counting/calculation unit 24, if errors are counted in Table 2, autonomously transmits the count to the upper notification interface unit 25 at prescribed notification timing such as a certain time intervals or a certain times (in the following example, the timing is the time indicated in the performance table as an example). The information in Table 2 is stored for a certain period of time rather than autonomously transmitted.

For example, in the record of item number "1", the error counting result between 7:45, not shown in the table, and 8:00 is recorded, and the total error number is "10" and the newly detected error number is "0" during the period. In this case, since the newly detected error number is "0", the autonomous notification to the upper notification interface unit 25 is not performed at 8:00. The same is applied to the item number 2 and the item number 4, in which the newly detected error number is "0", the autonomous notification to the upper notification interface unit 25 is not performed at 8:15 and 8:45. However, the item number 3 and the item number 5 have the newly detected error numbers of "15" and "2", respectively, and the autonomous notification to the upper notification interface unit 25 will be performed at 8:30 and 9:00. The item number 3 has the total error number "15" (all corresponding to the newly detected error) and the error number is autonomously notified to the upper notification interface unit 25. The item number 5 has, among the total error number of "5", "3" corresponding to the re-detected errors, and "2" corresponding to the newly detected errors. In such a case, the error number of "2" is autonomously notified to the upper notification interface unit 25.

The upper notification interface unit 25, when receiving information from the error counting/calculation unit 24, generates a notification message by adding the identification number of the node and transmitting the notification message to the upper apparatuses not shown in FIG. 8, for example. When receiving an obtainment request of performance information from the upper apparatuses, in response to the request, the upper notification interface unit 25 obtains a part of or all information (information in Table 1 in particular) from the error counting/calculation unit 24, generates a notification message from the obtained information, and transmits to the upper apparatuses.

Figure 9:
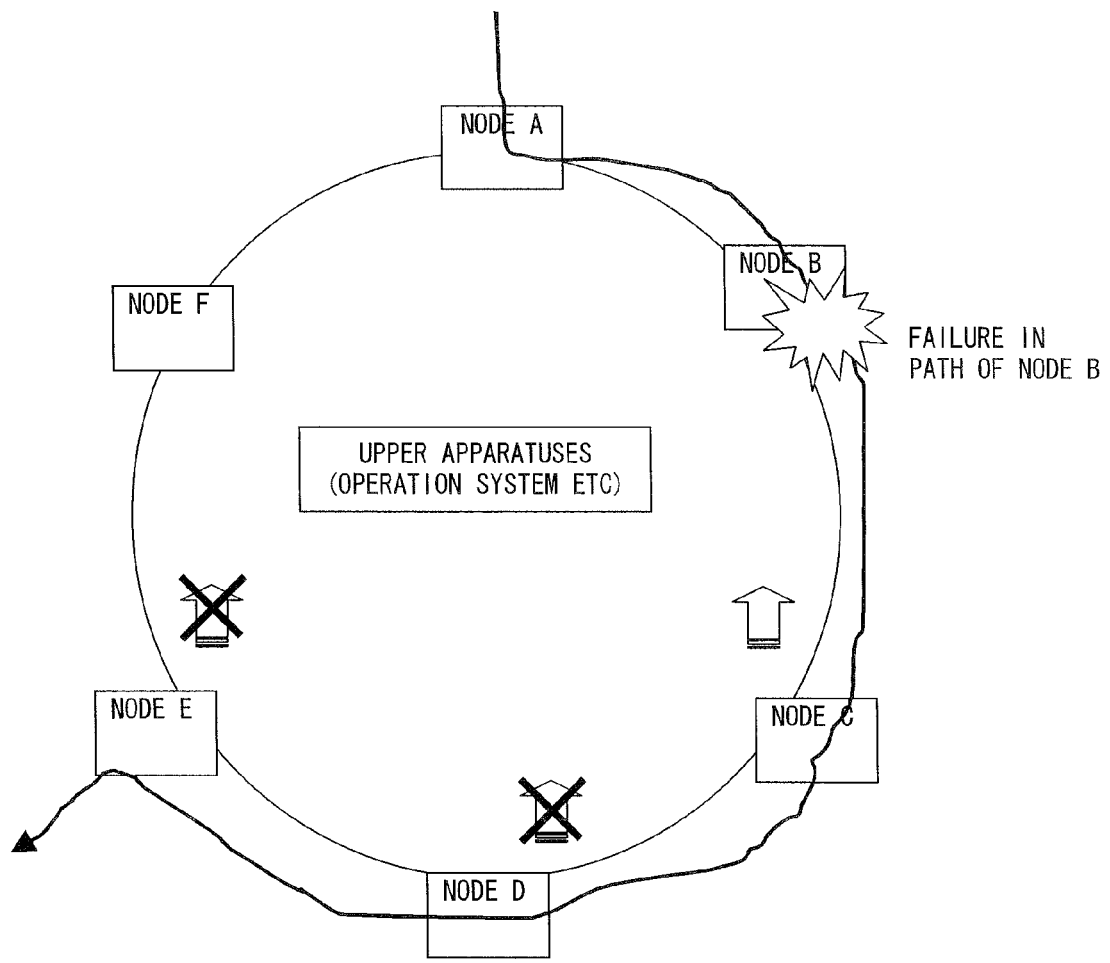
FIG. 9 is a diagram showing a relation between a location of communications line failure in the ring topology optical transmission network and nodes autonomously notifying the communications line monitoring apparatus of the communications line failure.

FIG. 9 is a diagram showing a relation between the location of communications line failure in the ring topology optical transmission network shown in FIG. 4 and nodes autonomously notifying the communications line monitoring apparatus of the communications line failure.

In the example of FIG. 9, the case in which a failure occurs in a path in a node B is shown as an example of communications line failure.

In the optical transmission network comprising the above node, when failure occurs in a path of the node B, a node indicated by an outlined arrow in FIG. 9 alone (a node C alone, not including a node D or a node E having a cross on the arrow) autonomously transmits a notification message of the communications line failure to the communications line monitoring apparatus. In other words, with the present configuration, communications line failure is first detected by the node which is the closest to the location of the communications line failure and receives a communication frame. The notification message is autonomously transmitted to the communications line monitoring apparatus only from the first detected node.

Variation of Embodiment 1

In the embodiment 1, two (an even number) of user areas are used as the storage area of the "previous error detection determination information" such as the "previous error detection information" and the "error undetected information". In this variation, however, a single (an odd number) user area alone is used as a storage area of the "previous error detection determination information".

In order to realize such a form, a configuration such that the single user area is removed from the operation range of the parity operation implemented in each node is required, given that, the expected value is to be used in the parity operation of the single user area without changing the parity operation range.

In this embodiment, first, calculation of BIP-8 is performed to all bits of the path frame P, shown in a shaded area in FIG. 3, in a device generating path frames. The calculation result (ire. BIP-8 code) is stored in the B3 area of the frames transmitted subsequently. The device receiving these frames (nodes in this embodiment) checks errors in the previously received path frames by comparing recalculation result by BIP-8 performed in the whole path frame by replacing the F2 byte (or the F3 byte) in a received path frame (received frame) by a prescribed expected value (for example, a value used for the F2 byte (or the F3 byte) in performing parity operation in path frame generation device) and the BIP-8 code stored in the path frame received subsequently.

When an error in a path frame is first detected in a node, a target bit in an area (the F2 byte or the F3 byte) to be replaced by an expected value in the parity operation is inverted in the node. For example, the head bit of the F2 byte (or the F3 byte) is inverted from "1" to "0" or it is inverted from "0" to "1". Alternatively, another bit of the F2 byte (or the F3 byte) is inverted from "1" to "0", or it is inverted from "0" to "1".

Figure 10:
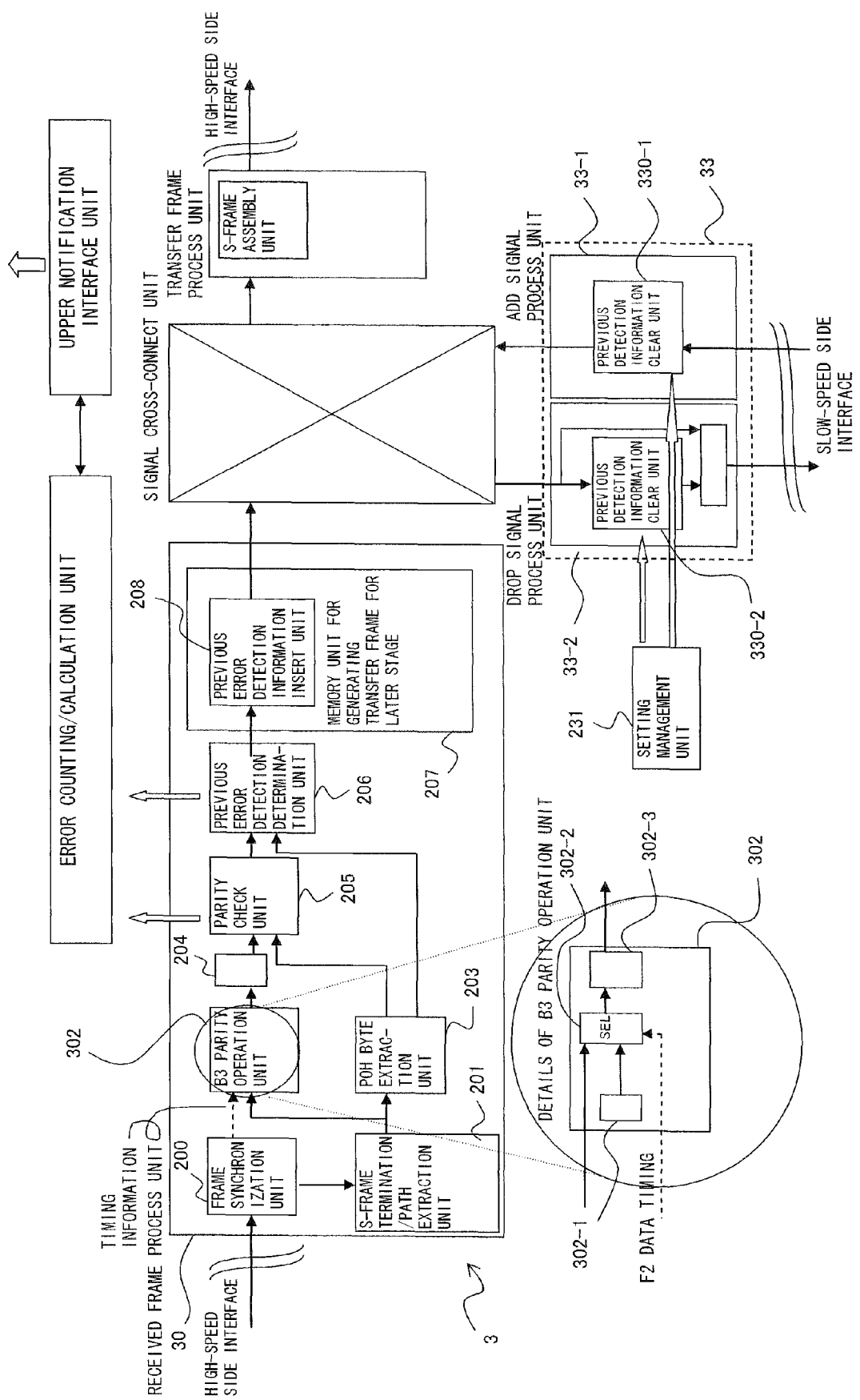
FIG. 10 is a functional block diagram of a node of a variation example.

FIG. 10 is a functional block diagram of a node in which the value of the previous error detection determination information storage area is replaced by an expected value in the parity operation.

This configuration is basically the same as the configuration of the node shown in FIG. 6. For that reason, the same reference numerals as FIG. 6 are used in FIG. 10 to refer to similar components, and the part different from the embodiment 1 alone is explained in the following description.

This form has a configuration in which the value of the previous error detection determination information storage area is replaced by an expected value in the parity operation, and therefore, the configurations of the parity operation unit 302 and the add/drop signal process unit 33 are different.

The parity operation unit 302 of FIG. 10 comprises an expected value memory 302-1, a select (SEL) circuit 302-2, and a B3 calculation circuit 302-3.

The expected value memory 302-1, in this example, stores F2 byte replacement information (expected value) and F2 byte timing information, and this information is outputted to the select circuit 302-2.

The select circuit 302-2 receives timing data outputted from the frame synchronization unit 200 and path frames outputted from the S-frame termination/path extraction unit 201, and outputs path frame data, in which the F2 byte value is replaced by the expected value, to the B3 calculation circuit 302-3. The select circuit 302-2 normally outputs the pass frame data inputted in synchronism with timing data to the B3 calculation circuit 302-3 without modification; however, if timing indicated by the timing information is detected from the input timing data, an expected value in memory are outputted to the B3 calculation circuit 302-3 for a certain time period since the timing.

The B3 calculation circuit 302-3 performs the same parity operation as in the B3 parity operation circuit 202 based on the path frame (a path frame containing an expected value in F2 byte) output from the select circuit 302-2.

The add/drop signal process unit 33 comprises a function essentially identical to the function of the add/drop signal process unit 23 of the embodiment 1. However, in this example, functions in the previous detection information clear units (330-1 and 330-2), comprised in each of the add signal process unit 33-1 and the drop signal process unit 33-2, are different. In this example, a single area alone (F2 area in this example) is used as the determination information of the previous detection information, the previous detection information clear units (330-1 and 330-2) clear the F2 byte of the POH unit of the path frame in the path frame. Note that the setting of the area or the value set to the area can be controlled by the setting management unit 231.

FIG. 11 is a timing chart diagram of the above signal process.

FIG. 11 is shown in the same format as FIG. 7. This embodiment, since the storage area of the previous detection determination information is the F2 area alone, does not have the shaded area indicating the F3 storage timing in FIG. 7.

In other words, in the present embodiment, since the extraction of F3 byte information of the second-arrived frame is not needed, it is possible to perform T3" previous error detection determination before the F3 storage timing, and stage transfer frame can be generated at early stage.

As described above, the present form uses a single area as a storage area of the "previous error detection determination information" such as the "previous error detection information" and "undetected error information". In the present form, since parity check is performed by replacing the previous error detection determination information by a prescribed expected value, if the value of the storage area of the "previous error detection determination information" is changed in the middle, a prescribed expected value is used in each node without using the value of the changed area. Therefore, all the nodes can obtain the parity operation result without influenced by the value of the area. In each node, even if a received frame has an error, it is possible to determine whether or not the error has already been detected in another node.

It should be noted that in the present example, the F2 byte is used as a storage area of the previous detection determination information; however, the F3 byte or other bytes may be used as appropriate.

Embodiment 2

This example uses an upper apparatuses' configuration for monitoring line quality information in an apparatus in which section termination is not performed.

In the embodiment 2, a configuration of the transmission device between nodes in the above network is presented as an example.

As a premise in this example, information in the B1 byte and the B2 byte provided in the overhead unit SOH of the section frame is to be the check target of the line quality. In other words, by comparing the information stored in the B1 byte and the B2 byte with the parity operation result in the receiver apparatus, the line quality is checked.

In addition, as a storage area of the previously detected information for the B1 byte (or the B2 byte), an unused byte (the D4 byte in the example) of the section overhead unit SOH is used. Particularly in this example, as the storage area of the previously detected information when the B1 byte and the parity operation result are different, the last bit of the D4 byte is used. As the storage area of the previously detected information when the B2 byte and the parity operation result are different, the second-to-the-last bit of the D4 byte is used. That is, in this example, like the variation of the embodiment 1, the configuration has a single area as the storage area of the previously detected information.

Figure 12:
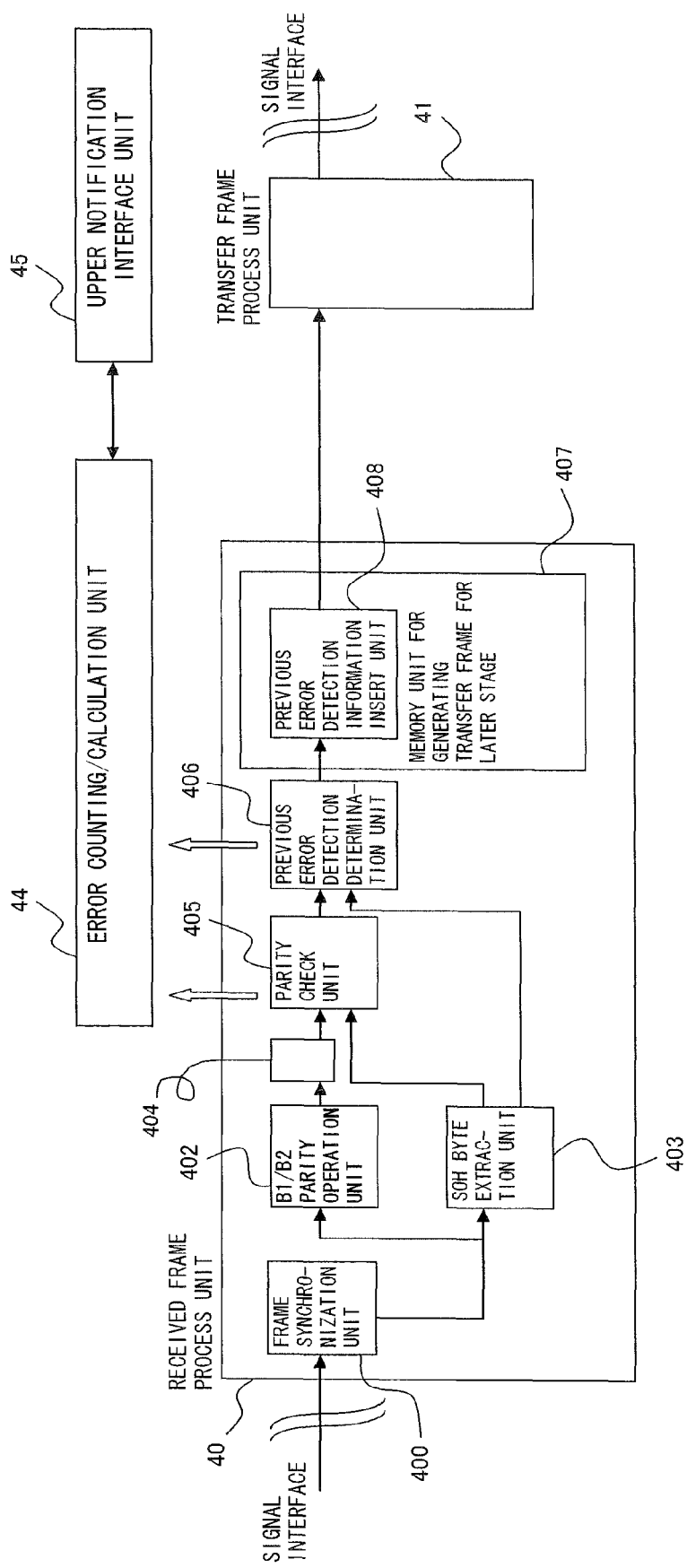
FIG. 12 is a functional block diagram of the transmission apparatus of embodiment 2.

FIG. 12 is a functional block diagram of the transmission apparatus that does not perform section termination.

The transmission apparatus 4 of FIG. 12 comprises a received frame process unit 40, a transmission frame process unit 41, an error counting/calculation unit 44, and a notification-to-upper interface unit 45.

The received frame process unit 40 comprises a frame synchronization unit 400, a B1/B2 parity calculation unit 402, a section overhead (SOH) byte extraction unit 403, a calculation result delay unit 404, a parity check unit 405, a previous error detection unit 406, and a memory unit 407 for generating transfer frame for later stage. The memory unit 407 for generating transfer frame for later stage comprises a previous error detection information insert unit 408.

Note that the former stage of the frame synchronization unit 400 comprises a high-speed side interface, although its description is omitted from FIG. 12. In the high-speed side interface, the optical signal transmitted through the transmission path is converted into a signal mode handled in the received frame process unit 40 (electrical signal or optical signal) by applying a wavelength division process or a 3R process (i.e., a waveform shape process, an amplification process and a data identification process), for example, and if necessary, a photoelectric conversion process. The following description is explained with the handling form being an electrical signal like Embodiment 1.

The frame synchronization unit 400 performs frame synchronization based on a signal obtained from the high-speed side interface unit, and specifies the head position of the received frame. The section frame output from the frame synchronization unit 400 is output to both the B1/B2 parity operation unit 402 and the SOH byte extraction unit 403, and the section frame is output to the memory unit 407 for generating transfer frame for later stage, although the signal line (a solid line arrow) is not shown in FIG. 12 in particular.

The SOH byte extraction unit 403 extracts the information sequentially in the order of the B1 byte information in SOH of the section frame output from the frame synchronization unit 400 (B1 information), the B2 byte information (B2 information), and the D4 byte information (D4 information). The B1/B2 parity operation unit 402 inputs the section frame output from the frame synchronization unit 400, executes the parity operation of B1 and B2 in parallel from the section frame by a prescribed method, for example, and each operation result is obtained. Like the configuration shown in the variation of the embodiment 1, the parity operation uses a prescribed expected value (the D4 byte value used for the parity operation in the section frame generation device) pre-stored in the internal memory instead of the D4 byte value of the section frame.

The information extracted in the SOH byte extraction unit 403 (B1 information, B2 information, and D4 information) is sequentially set to the parity check unit 405 and the previous error detection determination unit 406 as the latest comparison information, and the operation results obtained in the B1/B2 parity operation unit 402 (B1 operation result and the B2 operation result) are inputted to the parity check unit 405 via the operation result delay unit 404.

The operation result delay unit 404 delays timing to transmit the operation results received from the B1/B2 parity operation unit 402 (B1 operation result and the B2 operation result) to the parity check unit 405 until the timing when the B1/B2 information of the next frame is set to the parity check unit 405. In other words, in the parity check unit 405 and the previous error detection determination unit 406, the process to the first-arrived frame of two successive frames is performed using the information in SOH contained in the second-arrived frame. Note that the timing is explained later with reference to the drawings.

The parity check unit 405 compares the B1 operation result with the latest B1 information set from the SOH byte extraction unit 403 and the B2 operation result with the latest B2 information set from the SOH byte extraction unit 403 separately, and outputs each of the comparison result (information indicating match or mismatch) to the later stage. In this example, when either one of the comparison results shows mismatch, mismatch result is output to the error counting/calculation unit 44 as indicated by the outlined arrows in the drawing.

The previous error detection determination unit 406, when each of the comparison result information is input, compares preset bit information indicating whether the frame is previously detected (or undetected) with the corresponding bit of the latest D4 information set from the SOH byte extraction unit 403, and performs a determination process based on this comparison result and the two comparison results of the above comparison result in the parity check unit 405. This determination process is conducted in accordance with the combination of items such as whether the last bit or the second-to-the-last bit of the D4 information indicate the previous detection information or the undetected information and whether or not each of the comparison result in the parity check unit 405 matches.

Thus, in a case in which the last bit of the D4 information indicates "undetected" and the comparison result of B1 in the parity check unit 405 is mismatch, it is determined that a notification to the error counting/calculation unit 24 is required, and the insertion of the previous detection information to the last bit of D4 is required (determination pattern 1-1).

In a case in which the second-to-the-last bit of the D4 information indicates "undetected", and the comparison result of B2 in the parity check unit 405 is mismatched, it is determined that a notification to the error counting/calculation unit 24 is required, and the insertion of the previous detection information to the second-to-the-last bit of D4 is required (determination pattern 1-2).

For combinations other than the above two, it is determined that a notification to the error counting/calculation unit 24 is not required, and insertion of the previous detection information to the last bit or the second-to-the-last bit of D4 is not required (determination pattern 2).

The above determination is made in the previous error detection determination unit 406, and in the case of the determination pattern 1, a signal is outputted to the previous error detection information insertion unit 408 and a signal is also outputted to an error counting/calculation unit 44 as shown with an outlined arrow in FIG. 12. In the case of the determination pattern 2, a signal is output to the memory unit 407 for generating transfer frame for later stage.

The memory unit 407 for generating transfer frame for later stage, using a signal output from the previous error detection determination unit as a trigger, outputs each section frame, which has been input from the frame synchronization unit 400, to the transmission frame process unit 41 in the later stage.

The previous error detection information insertion unit 408, using the signal output from the previous error detection determination unit 406 as a trigger, overwrites the D4 byte of SOH of each section frame, which has been input from the frame synchronization unit 400, with information determined as "error previously detected" in the previous error detection determination unit 206, and outputs the overwritten information to the transmission frame process unit 41 in the later stage. This overwriting is performed when outputting a section frame to the transmission frame process unit 41 in the later stage, by inverting the last bit alone in the determination pattern 1-1, by inverting the second-to-the-last bit alone in the determination pattern 1-2, and by inverting both the last and the second-to-the-last bits in the determination pattern 1-1 and the determination pattern 1-2, for example.

The transmission frame process unit 41 transmits the section frame S output from the memory unit 407 for generating transfer frame for later stage to the next transmission apparatus. The section frame S is transmitted from the high-speed interface to the transmission path as an optical signal via electro-optical conversion unit or an optical multiplexing unit, not shown in FIG. 12, and the optical signal is transmitted to the next transmission apparatus.

The error counting/calculation unit 44 and the upper notification interface unit 45 is the same as the error counting/calculation unit 24 and the upper notification interface unit 25 in the embodiment 1, and therefore, the explanation is omitted in this embodiment.

FIG. 13 is a timing chart of the above signal process.

In FIG. 13, time is on the horizontal axis (the time goes back as the coordinate moves to the left), and timings of processes in each unit (shaded areas in FIG. 13) are shown in each row on the vertical axis. The numbers on the vertical axis of FIG. 13 are the numerical references of the corresponding process units in FIG. 12.

FIG. 7 shows process timings of the process targeting the two successively received frames (the first-arrived frame and the second-arrived frame).

In the following, the explanation of FIG. 13 is provided starting from the top.

In the B1/B2 parity operation unit 402, the parity operation process is executed consecutively from the head bits (T10 and T10') of the frames in order from the first-arrived frame to the second-arrived frame. In this example, since two types of parity operation results for the B1 byte and the B2 byte are required, the operation is performed in parallel. Note that the B1 byte, the B2 byte and the D4 byte assigned to SOH of each frame are arranged in the same position from the head bit of each frame, and therefore in the SOH byte extraction unit 403 the bytes are extracted at the same times (T11, T12, T13 or T11', T12', T13') elapsed from the head bit (T10 and T10') for each frame.

The matching check of the parity operation result performed in the parity check unit 405 is a process, which can be performed only by calculating the result of the parity operation from the frame, and for that reason, the check is performed after the parity operation of the first-arrived frame ends (i.e., during parity operation for the second-arrived frame), as shown in FIG. 13. This example has a configuration in which various determination information of the first-arrived frame is stored in the second-arrived frame. Thus, the matching check of the two parity operation results is performed after each of the timing (T11' and T12') extracting information in the B1 byte and the B2 byte from the second-arrived frame, as shown in FIG. 13. The matching check is performed by matching each parity operation result of the first-arrived frame and the B1 information and the B2 information of the second-arrived frame as indicated by arrows in FIG. 13.

The determination process performed in the previous error detection determination unit 406, because it requires the D4 information additionally, is performed after extracting the D4 byte information (T13') from the second-arrived frame.

The frame generation process in the memory unit 407 for generating transfer frame for later stage is performed after the determination result is obtained. However, the areas influenced by the determination result are the D4 byte to which the previous error detection information is inserted. Thus, frame generation starts without waiting for the end of the determination process as shown in FIG. 13.

Figure 14:
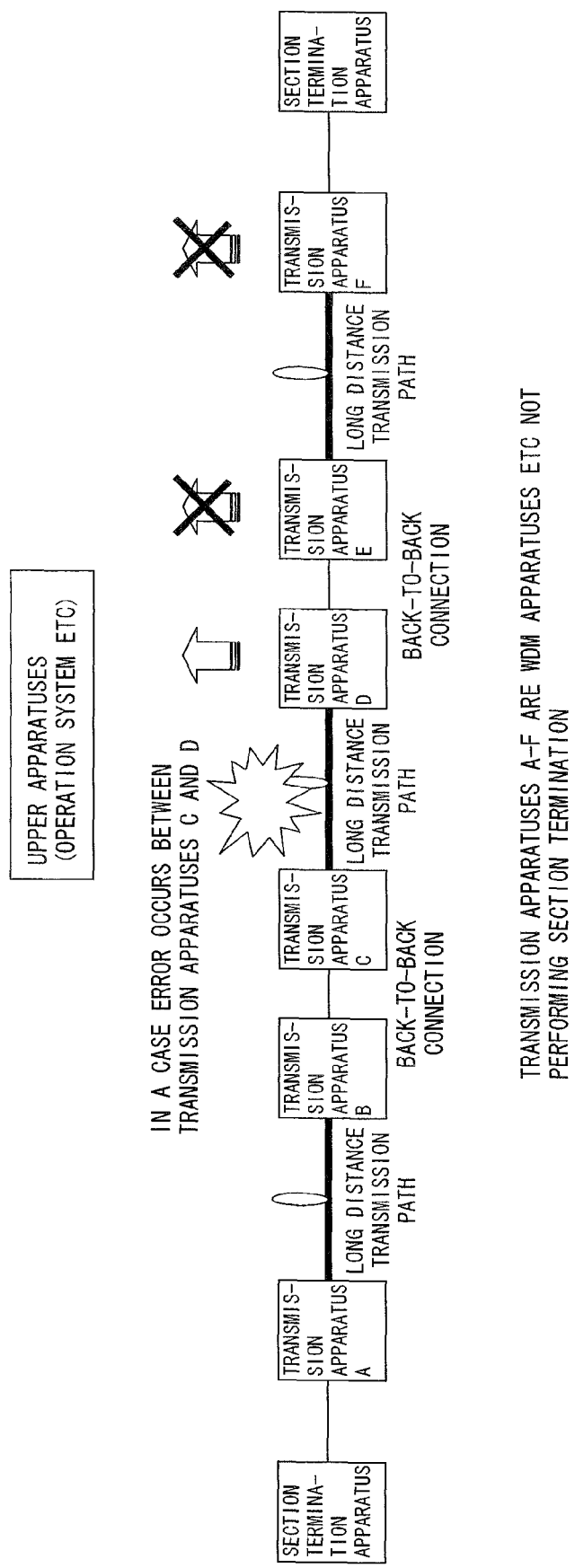
FIG. 14 is a diagram showing a relation between the location of communications line failure on a point-to-point connection communications line and a transmitting apparatus for autonomously notifying the communications line monitoring apparatus of the communications line failure.

FIG. 14 is a diagram showing a relation between the location of communications line failure on a communications line on which transmission apparatuses are connected in a row in point-to-point manner (for example, between each nodes of the above network), and a transmitting apparatus for autonomously notifying the communications line failure to the communications line monitoring apparatus.

FIG. 14 shows a configuration of a unit section interval in which a transmission apparatus A through a transmission apparatus F are connected in a row in alphabetical order and a section termination apparatus is connected to each end, as an example. The two section termination apparatuses correspond to adjacent two nodes shown in FIG. 4. Note that the section frame is transmitted from the left to the right of the transmission path shown in FIG. 14.

As shown in FIG. 14, when the line quality failure occurs in the transmission path between the transmission apparatus C and the transmission apparatus D in the configuration, only the transmission apparatuses, above which an outlined arrow are shown in FIG. 14 (the transmission apparatus D alone, the transmission apparatuses E and F having an arrow with "x" sign not included), autonomously transmit a communications line failure notification message to the communication line monitoring apparatus.

In other words, in this configuration, communication line failure is first detected in a transmission apparatus closest to the location of the communication line failure to which a communication frame is transmitted and a notification message is autonomously transmitted from the first detecting node alone to the communication line monitoring apparatus.

Embodiment 3

In the embodiments 1-2, a configuration in which parity operation previously detected information is transferred using the same line as the data transfer is shown. However, in the present embodiment, the configuration is one in which the parity operation previously detected information is transferred using a separate line.

As an example, a WDM (Wavelength Division multiplexing) apparatus, which does not perform the section termination, is explained.

In this apparatus, a signal with a plurality of wavelength channels being multiplexed is demultiplexed by wavelengths, and among the demultiplexed channels, a channel for data transfer (a main signal line) and a supervisor channel with a wavelength different from the main signal line (a sub signal line) are used. The sub-signal line is used for transferring a control signal of the WDM apparatus. Note that the sub-signal line is not an exclusive line for transmitting a notification message; however, in the examples described later, the notification message may be transmitted to the adjacent apparatuses through the sub-signal line. In such a case, a gateway apparatus performs the transmission of the notification message to the upper apparatuses, for example.

In the present embodiment, an area for storing the previous error detection determination information is provided in a frame transmitted in the sub-signal line (hereinafter referred to as a sub-signal frame) so that the sub-signal frame is transmitted through the sub-signal line in association with the frame transmitted through the main signal line (hereinafter referred to as a main signal frame).

Figure 15:
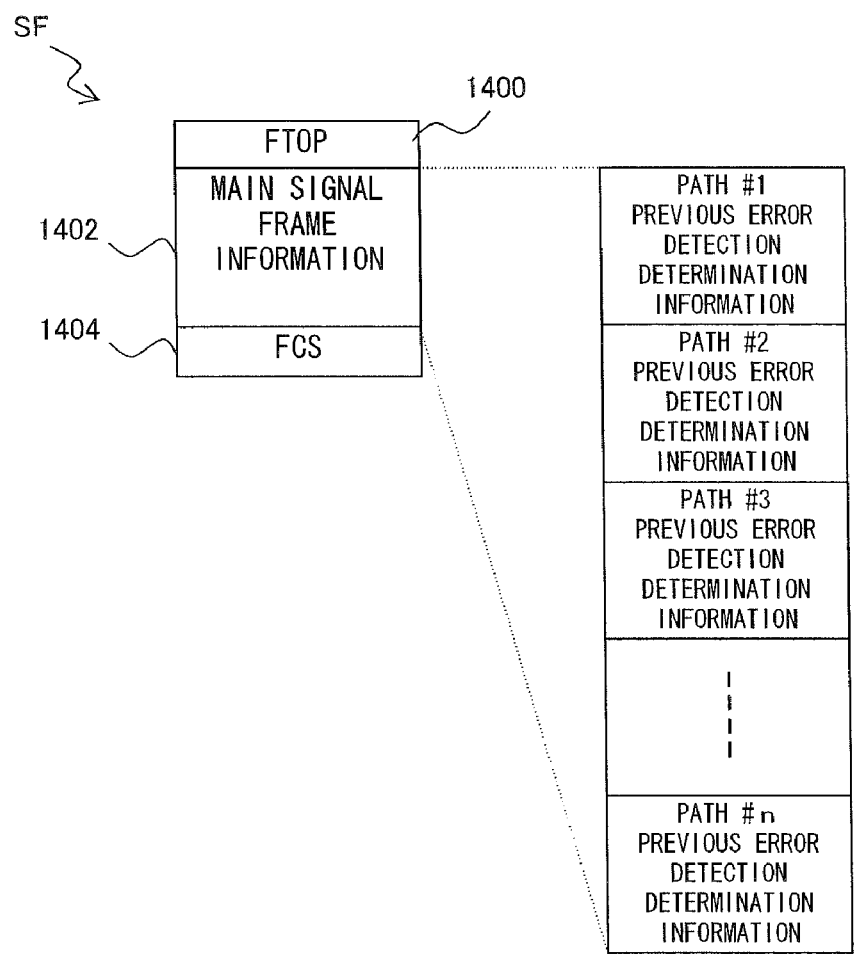
FIG. 15 is a format example of the sub signal frame.

FIG. 15 is a format example of the sub-signal frame.

The configuration of the sub-signal frame SF of FIG. 15 is divided into three areas of FTOP 1400, main signal frame information 1402, and FCS (Frame Check Sequence) 1404.

FTOP 1400 is an area for storing frame synchronization information for specifying the head position of the frame in a sub-signal received frame process unit described later, and identification information such as a frame number.

The main signal frame information 1402 is a storing area for the previous error detection determination information and the previous error detection determination information of a main signal frame (in this example, the previous error detection determination information of the B1 byte and the B2 byte). In FIG. 15, areas of a path #1 through a path #n (n is an integer) are provided. In this example, the path #1 is assigned to a storing area of the previous error detection determination information of the B1 byte and the path #2 is assigned to the storing area of the previous error detection determination information of the B2 byte.

FCS 1404 is an area for storing information for error check of the sub-signal frame in the receiving apparatus side. Note that the error check is a process commonly performed in each apparatus and therefore its explanation is omitted in the following description.

Figure 16:
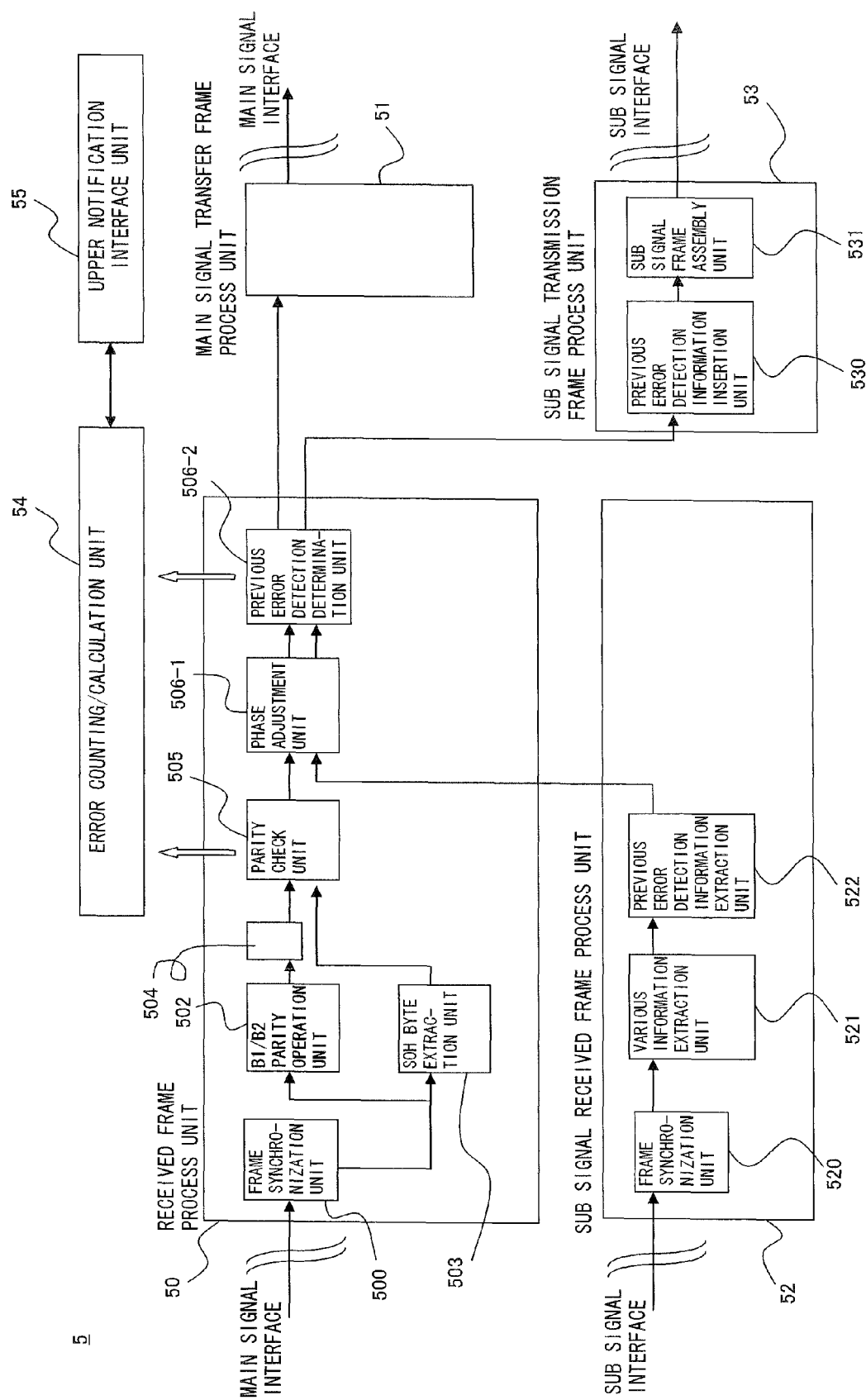
FIG. 16 is a functional block diagram of the WDM apparatus.

FIG. 16 is a functional block diagram of the WDM apparatus.

As shown in FIG. 16, a WDM apparatus 5 has a main signal and a supervisor signal (a sub-signal) input. Since each signal is formed to multiplexed WDM signal and transmitted through the transmission path, the wavelength demultiplexing process is performed in an interface unit (not shown in FIG. 15), which is provided in the former stage of the WDM apparatus 5, and the signal is input to the WDM apparatus 5 as a main signal and a sub-signal. A 3R process (i.e., a waveform shaping process, an amplification process, and a data identification process) or a photoelectrical conversion process, for example, is performed in a main signal interface unit and a sub-signal interface unit (omitted from FIG. 15) and each of the signals is input to the apparatus 5.

The WDM apparatus 5 of FIG. 15 comprises a received frame process unit 50, a transmission frame process unit 51, a sub signal received frame process unit 52, a sub-signal transmission frame process unit 53, an error counting/calculation unit 54, and an upper notification interface unit 55.

Among the above units, the received frame process unit 50 comprises a frame synchronization unit 500, a B1/B2 parity operation unit 502, a SOH (Section Overhead) byte extraction unit 503, an operation result delay unit 504, a parity check unit 505, a phase adjustment unit 506-1, and a previous error detection determination unit 506-2.

The frame synchronization unit 500 performs frame synchronization based on a signal obtained from the main signal interface unit and specifies the head position of the received frame. The section frame outputted from the frame synchronization unit 500 is output to both the B1/B2 parity operation unit 502 and the SOH byte extraction unit 503. In addition, although a signal line (a solid line arrow) is not particularly shown in FIG. 15, the section frame is outputted to the main signal transmission frame process unit 51 as well.

The SOH byte extraction unit 503 sequentially extracts the B1 byte information (B1 information) and the B2 byte information (B2 information) in SOH of the section frame output from the frame synchronization unit 500. The B1/B2 parity operation unit 502 receives the input of the section frame outputted from the frame synchronization unit 500 and the parity operation result is obtained for each of B1 and B2 from the section frame using each operation method. In this example, operations are performed in parallel.

The information extracted in the SOH byte extraction unit 503 (B1 information and B2 information) is sequentially set to the parity check unit 505 as the latest comparison information and the operation result obtained in the B1/B2 parity operation unit 502 (B1 operation result and B2 operation result) are inputted to the parity check unit 505 via the operation result delay unit 504.

The operation result delay unit 504 delays timing to transmit the operation result received from the B1/B2 parity operation unit 502 (B1 operation result and B2 operation result) to the parity check unit 505 until the timing when the B1/B2 information of the next frame is set to the parity check unit 505. In other words, in the parity check unit 505, the process to the first-arrived frame of two successive frames is performed using the information in SOH contained in the second-arrived frame. Note that the timing is explained later with reference to the drawings.

The parity check unit 505 compares the B1 operation result with the latest B1 information set from the SOH byte extraction unit 503 and the B2 operation result with the latest B2 information set from the SOH byte extraction unit 503 separately and outputs each of the comparison results (information indicating match or mismatch) to the later stage. In this example, if one of the comparison results is mismatched (as indicated by an outlined arrow in FIG. 15) the mismatch result is outputted to the error counting/calculation unit 44.

The phase adjustment unit 506-1 matches the phases of B1 error previous detection determination information transmitted from the sub-signal received frame unit 52 explained later and the B1 comparison result information output from the parity check unit 505 and the phases of the B2 previous error detection determination information transmitted from the sub signal received frame unit 52 explained later and the B2 comparison result information outputted from the parity check unit 505, and outputs them to the previous error detection determination unit 506-2.

The previous error detection determination unit 506-2, when the above various types of information having the matched phases are input, compares information indicating previously detected (or undetected) set in advance with B1 previous error detection determination information and B2 previous error detection determination information and the determination process is performed based on the comparison result and both the B1 and the B2 comparison result information. In the determination process, whether the B1 previous error detection determination information and the B2 previous error detection determination information indicate previous detection information or undetected information, and whether or not the B1 comparison result information matches the B2 comparison result information are combined with each other and the determination is made in accordance with the combination.

For example, when the B1 previous error detection determination information indicates undetected and the B1 comparison result information is mismatched, it is determined that the notification to the error counting/calculation unit 54 is necessary and the B1 previous error detection determination information needs to be changed to previously detected information (determination pattern 1-1).

When the B2 previous error detection determination information indicates undetected and the B2 comparison result information is mismatched, it is determined that the notification to the error counting/calculation unit 54 is necessary, and the B2 previous error detection determination information needs to be changed to previously detected information (determination pattern 1-2).

When the B1 previous error detection determination information indicates previously detected and the B1 comparison result information is mismatched, it is determined that the notification to the error counting/calculation unit 54 is not necessary, and the B1 previous error detection determination information needs to be changed to previously detected information (determination pattern 2-1).

When the B2 previous error detection determination information indicates previously detected and the B2 comparison result information is mismatched, it is determined that the notification to the error counting/calculation unit 54 is not necessary, and the B2 previous error detection determination information needs to be changed to previously detected information (determination pattern 2-2).

For combinations other than the above four, it is determined that a notification to the error counting/calculation unit 54 is not required, and the B1 previous error detection determination information needs to be changed to undetected information (or the B2 previous error detection determination information needs to be changed to undetected information). This is considered determination pattern 3.

The previous error detection determination unit 506-2, after the above determination process, outputs a trigger for generating a main signal transmission frame to the main signal transmission frame process unit 51 in the later stage, and outputs a signal indicating the above determination result to the sub-signal transmission frame process unit 53 in the later stage.

The main signal transmission frame process unit 51, when receiving a trigger signal from the previous error detection determination unit 506-2, transmits the section frame to the main signal interface unit.

The sub-signal received frame process unit 52 comprises a frame synchronization unit 520, a various information extraction unit 521, and a previous error detection information extraction unit 522.

The frame synchronization unit 520 performs frame synchronization based on the signal obtained from the sub-signal interface unit, and specifies the head position of the received frame. From the sub-signal frame output from the frame synchronization unit 520, information necessary in the various information extraction units (e.g., the various control information or previous error detection determination information, among others, in an apparatus) is extracted and is transmitted to each unit in the apparatus. Using the above amount, the previous error detection determination information is outputted to the previous error detection information extraction unit 522 in the later stage, and both the B1 previous error detection determination information and B2 previous error detection determination information are extracted in the previous error detection information extraction unit 522, and is outputted to the phase adjustment unit 506-1.

The sub-signal transmission frame process unit 53 comprises a previous error detection information insertion unit 530, and a sub-signal frame assembly unit 531.

The previous error detection information insertion unit 530 inserts previously detected information or undetected information into the previous error detection determination information based on a signal indicating the determination result output from the previous error detection determination unit 506-2.

The sub-signal frame assembly unit 531 assembles the sub-signal frame based on the inserted information of the previous error detection determination unit 506-2, and transmits the sub-signal frame to the sub-signal interface unit.

The error counting/calculation unit 54 and the upper notification interface unit 55 are the same as the error counting/calculation unit 24 and the upper notification interface unit 25 in embodiment 1, and therefore the explanation is omitted in the following description.

Figure 17:
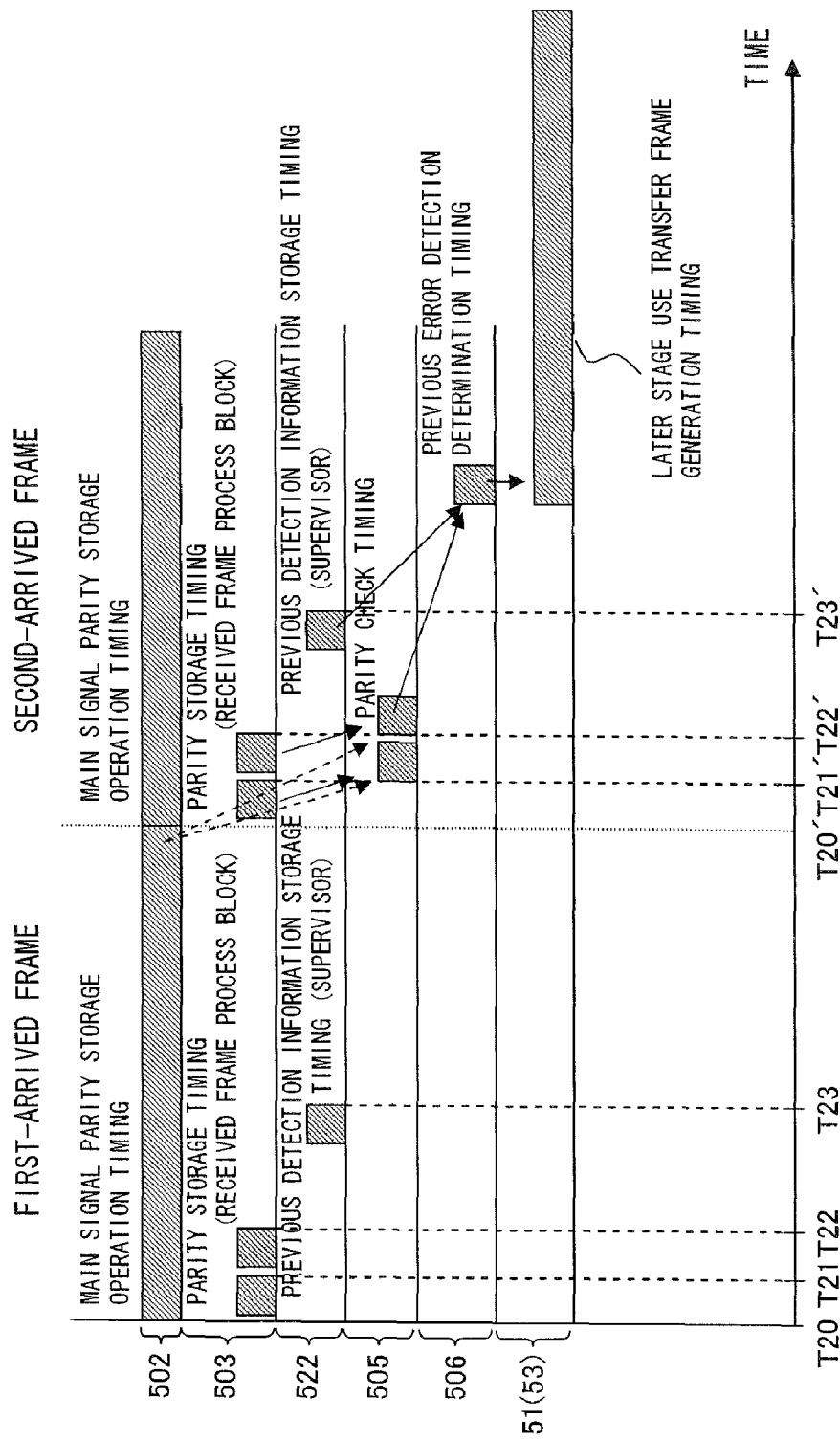
FIG. 17 is a timing chart of the signal process of the WDM apparatus of embodiment 3.

FIG. 17 is a timing chart of the above signal process.

In FIG. 17, time is on the horizontal axis (the time goes back as the coordinate moves to the left), and timings of processes in each unit (shaded areas in FIG. 17) are shown in each row on the vertical axis. The numbers on the vertical axis of FIG. 17 are the numerical reference of the corresponding process units in FIG. 16.

FIG. 17 shows process timings of the process targeting the received two successive frames (first-arrived frame and second-arrived frame).

In the following, the explanation of FIG. 17 is provided starting from the top.

In the B1/B2 parity operation unit 502, the parity operation process is executed continuously from the head bits (T20 and T20') of the frames in the order from the first-arrived frame to the second-arrived frame. In this example, since two types of parity operation results of the B1 byte and the B2 byte are required, operation is performed in parallel. Note that the B1 byte, the B2 byte and the D4 byte assigned to SOH of each frame are arranged in the same position from the head bit of each frame, and therefore, in the SOH byte extraction unit 503, the bytes are extracted at the same times (T21, T22 or T21', T22') elapsed from the head bit (T20 and T20') for each frame.

The matching check of the parity operation result performed in the parity check unit 505 is a process which can be performed only by calculating the result of the parity operation from the frame. For that reason, the check is performed after the parity operation of the first-arrived frame ends (during parity operation for the second-arrived frame), as shown in FIG. 17. This example has a configuration in which various determination information of the first-arrived frame is stored in the second-arrived frame. Thus, the matching check of the two parity operation results is performed after receiving each of the timing (T21' and T22') extracting information in the B1 byte and the B2 byte from the second-arrived frame, as shown in FIG. 17. The matching check of the two results is performed by matching each parity operation result of the first-arrived frame and the B1 information and the B2 information of the second-arrived frame as indicated by arrows in FIG. 17.

Since the determination process performed in the previous error detection determination unit 506-2 further requires previous error detection determination information, the process is performed after extracting the previous error detection determination information from a sub-signal frame transmitted in the sub signal line (T23').

The main signal frame generation process in the main signal transmission frame process unit and the sub-signal frame generation process in the sub-signal transmission frame process unit are performed after the above determination results are obtained. However, the area influenced by the above determination result is the D4 byte to which the previous error detection information is inserted, and therefore, it is possible to start frame generation without waiting for the end of the determination process as shown in FIG. 17.

Although in embodiments 1 through 3 described above, an SDH network is used as an example for the explanation, the embodiments are not limited to an SDH network and may be implemented in an SONET network.

In addition, although in embodiments 1 through 3, a ring topology optical transmission network is used as an example for the explanation, the configurations in the embodiments shall be applied not only to the ring topology optical transmission network but also to a mesh topology or a point-to-point connection optical transmission network.

As described in the above embodiments 1 through 3, when any failure occurs in a communications line for transmitting data, and any error is caused in the transmitted data, a relay apparatus first detected the error alone autonomously transmits a notification (a notification message) of the line failure to the communications line monitoring apparatus. Therefore, the number of the notification messages transmitted in lines between each relay apparatus and the communications line monitoring apparatus can be reduced.

Consequently, congestion of lines transmitting a notification message can be controlled without improving a process in the communications line monitoring apparatus or enhancing lines transmitting a notification message (by increasing the size of the DCC line), and furthermore, the process of the communications line monitoring apparatus can be reduced. The communications line monitoring apparatus can monitor the line quality in real time.

The number of notification messages transmitted in lines (control lines in general) between each relay apparatus and the communications line-monitoring apparatus can be reduced.

Because the amount of messages to be processed is reduced, the congestion of lines transmitting notification messages is reduced, and the number of processes of the communications line monitoring apparatus is reduced as well. For that reason, the communications line monitoring apparatus can monitor the line quality in real time.

Furthermore, because the amount of messages sent to the communications line monitoring apparatus is controlled, improvement in the process of the communications line monitoring apparatus and enhancement of the line transmitting the notification message (increasing the size of the DCC line) are not needed.

Note that the present invention may be implemented by any combination of the above-described modes or other modifications and variations without departing from the main features and spirit of the inventions. Thus the above embodiments are mere examples in many aspects and shall not be interpreted as a limitation. The scope of the present invention should not be limited by the text of the specification but is presented by the scope of the claims. In addition, all modifications and alternative configurations, which fairly fall within a scope equivalent to the basic scope of the claims, are to be construed as the implementation of the present invention.

What is claimed is:

1. A communications line monitoring system, comprising a plurality of relay apparatuses, and a communications line monitoring apparatus for monitoring line quality of a communication path of data transmitted between the plurality of relay apparatuses, wherein each of the relay apparatus comprises:
    an error detection unit for detecting an error in received data;
    a previous error detection determination unit for determining whether or not the error detection has already been performed on the received data in another relay apparatus based on whether or not previous error detection information is added to the received data; and
    an initial error detection process unit, used only when an error is detected in the received data and the error in the received data has been undetected in other relay apparatus, for notifying the communications line monitoring apparatus of error detection information of abnormality in the line, and for adding previous error detection information to data transmitted to a downstream relay apparatus.

2. The communications line monitoring system according to claim 1, wherein
    the error detection unit detects an error in the received data by comparing parity operation result information included in the received data in advance with operation result information of parity operation performed on the received data, and
    the initial error detection process unit, when adding previous error detection information to data transmitted to a downstream relay apparatus, adds the previous error detection information in an arrangement so as not to influence the error detection result.

3. The communications line monitoring system according to claim 2, wherein
    the initial error detection process unit, when the parity operation is performed on the received data for every prescribed bits, adds the previous error detection information by inverting a prescribed even number of bits of parity operation target bit.

4. The communications line monitoring system according to claim 1, wherein
    the error detection unit performs the parity operation of the received data by replacing a value at a target position for adding the previous error detection information with a prescribed expected value, and detects an error in the received data by comparing operation result information of the parity operation with parity operation result information included in the received data in advance.

5. The communications line monitoring system according to claim 1, comprising:
    an internal initialization unit for changing a value at a target position for adding the previous error detection information in data transmitted from an external network to undetected information; and
    an external initialization unit for changing a value at a target position for adding the previous error detection information in data transmitted to an external network to external network setting information.

6. The communications line monitoring system according to claim 5, further comprising a setting management unit for managing a setting value of the undetected information and the external network setting information.

7. The communications line monitoring system according to claim 1, comprising a plurality of relay apparatuses to which a main signal line transmitting main data and a sub-signal line transmitting sub-data are set, and a communications line monitoring apparatus for monitoring line quality of a communication path of data transmitted between the plurality of relay apparatuses, wherein the relay apparatus comprises:
- an error detection unit for detecting an error of the main data received form the main signal line;
- a previous error detection determination unit for determining whether or not error detection has already been performed on the main data in another relay apparatus based on whether or not previous error detection information is added to the sub-data received from the sub-signal line; and
- an initial error detection process unit, used only when an error is detected in the main data and the error in the main data has been undetected in another relay apparatus, for notifying the communications line monitoring apparatus of error detection information of abnormality in the main signal line, and for adding previous error detection information to the sub-data transmitted to a downstream relay apparatus.

8. A relay apparatus for examining received data and, when an error is present in the received data, for notifying line failure to the communications line monitoring apparatus, comprising:
- an error detection unit for detecting an error of the received data;
- a previous error detection determination unit for determining whether or not the error detection has already been performed on the received data in another relay apparatus based on whether or not previous error detection information is added to the received data; and
- an initial error detection process unit, used only when an error is detected in the received data and the error in the received data has been undetected in other relay apparatus, for notifying the communications line monitoring apparatus of error detection information of abnormality in the line, and for adding previous error detection information to data transmitted to a downstream relay apparatus.

9. The relay apparatus according to claim 8, wherein
the error detection unit detects an error in the received data by comparing parity operation result information included in the received data in advance with operation result information of parity operation performed on the received data, and
the initial error detection process unit, when adding previous error detection information to data transmitted to a downstream relay apparatus, adds the previous error detection information in an arrangement so as not to influence the error detection result.

10. The relay apparatus according to claim 9, wherein
the initial error detection process unit, when the parity operation is performed on the received data for every prescribed bits, adds the previous error detection information by inverting a prescribed even number of bits of parity operation target bit.

11. The relay apparatus according to claim 8, wherein
the error detection unit performs the parity operation of the received data by replacing a value at a target position for adding the previous error detection information with a prescribed expected data, and detects an error in the received data by comparing operation result information of the parity operation with parity operation result information included in the received data in advance.

12. The relay apparatus according to claim 8, comprising:
- an internal initialization unit for changing a value at a target position for adding the previous error detection information in data transmitted from an external network to undetected information; and
- an external initialization unit for changing a value at a target position for adding the previous error detection information in data transmitted to an external network to external network setting information.

13. The relay apparatus according to claim 12, further comprising a setting management unit for managing a setting value of the undetected information and the external network setting information.

14. The relay apparatus according to claim 8, having a main signal line transmitting main data and a sub-signal line transmitting sub-data, for examining the main data and, when an error is present in the main data, for notifying main line failure to the communications line monitoring apparatus, comprising:
- an error detection unit for detecting an error of the main data received from the main signal line;
- a previous error detection determination unit for determining whether or not error detection has already been performed on the main data in another relay apparatus based on whether or not previous error detection information is added to the sub-data received from the sub-signal line; and
- an initial error detection process unit, only when an error is detected in the main data and the error in the main data has been undetected in another relay apparatus, for autonomously notifying the communications line monitoring apparatus of error detection information of abnormality in the main signal line, and for adding previous error detection information to sub data transmitted to a downstream relay apparatus.

15. A communications line monitoring method of a communications line monitoring system, having a plurality of relay apparatuses, and a communications line monitoring apparatus for monitoring line quality of a communication path of data transmitted between the plurality of relay apparatuses, comprising:
- examining presence or absence of an error in data received by the relay apparatus;
- notifying the communications line monitoring apparatus of error detection information of abnormality in the communications line when an error is detected in the received data; and
- controlling, when the error is redetected in a relay apparatus located downstream of the relay apparatus, notification of the error detection information from the downstream relay apparatus to the communications line monitoring apparatus.

16. A communications line monitoring method according to claim 15, wherein notifying the communications line monitoring apparatus of error detection information of abnormality in the communications line occurs only when the error is detected in the received data and the error in the received data has been undetected in other relay apparatus.

* * * * *